United States Patent
Yoshihara et al.

(10) Patent No.: US 6,802,559 B2
(45) Date of Patent: Oct. 12, 2004

(54) INSTRUMENT PANEL ASSEMBLY FOR VEHICLE

(75) Inventors: Toshikazu Yoshihara, Kasukabe (JP); Toshio Ohashi, Sano (JP); Takeshi Ogasawara, Sano (JP); Takaharu Wakabayashi, Konosu (JP); Takashi Uchida, Tokorozawa (JP)

(73) Assignee: Calsonic Kansei Corporation, Tokyo (JP)

( * ) Notice: Subject to any disclaimer, the term of this patent is extended or adjusted under 35 U.S.C. 154(b) by 0 days.

(21) Appl. No.: 10/369,570

(22) Filed: Feb. 21, 2003

(65) Prior Publication Data

US 2003/0155793 A1 Aug. 21, 2003

(30) Foreign Application Priority Data

| Feb. 21, 2002 | (JP) | ........................................ | 2002-045085 |
| Feb. 22, 2002 | (JP) | ........................................ | 2002-046070 |
| Mar. 27, 2002 | (JP) | ........................................ | 2002-089306 |
| Mar. 27, 2002 | (JP) | ........................................ | 2002-089313 |

(51) Int. Cl.$^7$ ............................ B62D 25/14; B60R 7/06
(52) U.S. Cl. .................. 296/208; 296/37.12; 296/70
(58) Field of Search ............................ 296/208, 37.12, 296/70

(56) References Cited

U.S. PATENT DOCUMENTS 6,110,037 A * 8/2000 Yoshinaka .................. 454/143

FOREIGN PATENT DOCUMENTS

| EP | 456531 A1 | * | 11/1991 | |
| EP | 607585 A1 | * | 7/1994 | .................. 296/70 |
| EP | 1323593 A1 | * | 12/2002 | |
| GB | 2079694 | * | 1/1982 | .................. 296/70 |
| JP | 0022536 | * | 2/1980 | .............. 296/37.12 |
| JP | 63-251380 A | | 10/1988 | |
| JP | 1-152833 U | | 10/1989 | |
| JP | 5-155271 A | | 6/1993 | |
| JP | 7-052683 A | | 2/1995 | |
| JP | 9-323568 A | | 12/1997 | |
| JP | 11-254998 A | | 9/1999 | |
| RU | 1126485 A | * | 11/1984 | .................. 296/70 |

* cited by examiner

*Primary Examiner*—Dennis H. Pedder
(74) *Attorney, Agent, or Firm*—Foley & Lardner LLP

(57) ABSTRACT

An assembly body has a vent duct arranged below an instrument panel of a vehicle and a glove compartment is provided. This duct assembly body includes of two panels divided into an upper-half and a lower-half, which are formed by resin injection molding, and a lower-half of the vent duct and the glove compartment are integrally molded in the lower-half panel.

15 Claims, 18 Drawing Sheets

US 6,802,559 B2

INSTRUMENT PANEL ASSEMBLY FOR VEHICLE

BACKGROUND OF THE INVENTION

1. Field of the Invention

The present invention relates to an instrument panel assembly for a vehicle.

2. Description of Related Art

Conventionally, in order to secure convenience of a vehicle, besides a glove compartment (a glove box) provided in the front of a foot part of a passenger seat among an instrument panel, the glove compartment being generally manufactured by assembling a plurality of resin injection-molded components by means of vibration welding and screws, a glove compartment with or without a lid is also provided in a door finisher or a console. Since the above-described glove compartments are insufficient, a simple glove compartment and a cup holder, which are commercially available as vehicle supplies, are further attached to an outer surface of the instrument panel or in the vicinity of air outlets.

Moreover, as a vent duct is fabricated by a resin-made blow-molded component or injection-molded component installed ranging from an air outlet of an air conditioner to an outlet of the instrument panel. The vent duct solely functions as a carrying path of air. A wire harness is branched off from a main wire harness routed in a car body, and a main line part thereof is fixed to any of a partition wall panel between a passenger room and an engine room, the instrument panel, a steering support member and the like by means of dedicated clips and the like. The wire harness is further branched off from the above main line and connected to various kinds of meters, an audio unit, the air conditioner and the like mounted in the instrument panel.

For example, in Japanese Patent Application Laid-Open No. Hei 7 (1995)-52683, disclosed are ducts having box-shaped cross sectional structures obtained by welding injection-molded resin plate materials to resin-made base materials constituting structures of instrument panels. In Japanese Patent Application Laid-Open No. Hei 9 (1997)-323568, disclosed is one which is obtained in such a manner that lower wall faces of ducts such as a vent duct, a defroster duct and the like are integrally molded by injection molding and then vibration-welded to a resin-made instrument pad core material.

It is user-friendly that the glove compartment of the vehicle is installed in an instrument panel part in front of a passenger. There is a high degree of necessity to install the glove compartment in the instrument panel part in front of the passenger by considering a space in a lower part of the instrument panel. However, one installing the glove compartment in the instrument panel part in front of the passenger or one obtained by combining the vent duct and the glove compartment together has never been proposed.

Moreover, it is necessary to provide an instrument panel applied to saving of a space of the vent duct, combining with other components disposed in the lower part of the instrument panel therewith and modularization of the instrument panel.

Moreover, as a conventional vehicle instrument panel, as described in Japanese Patent Application Laid-Open No. Sho 63 (1988)-251380 or No. Hei 11 (1999)-254998, the instrument panel can be mounted onto an engine compartment in such a manner that a plurality of attachment parts provided at an upper-side front end portion of the instrument panel are fastened and supported onto an instrument bracket provided at an upper-side end portion of a cowl box constituting a car body of a vehicle by use of bolts and the like and that attachment parts provided in lower-side left and right end portions of the instrument panel are fastened and supported onto a steering member constituting the car body of the vehicle by use of bolts and the like.

However, with the conventional constitution, in the case where a front to rear width size of members constituting the instrument panel is large, for example, in the case of an instrument module in which an accessory component such as a steering column is previously supported in the instrument panel, there is a possibility in difficulty for the above to be entered into the passenger room without interference with opening of the door. The above-described becomes a significant problem when the instrument panel is inserted into the passenger room by use of set jigs. Moreover, in the ease of the instrument panel uniformly covered from the upper side to the lower side with a cover, when the need of exchanging members in the inner side of the instrument panel and the like arises after mounting the instrument panel onto the car body of the vehicle, a maintenance efficiency of the vehicle is impaired due to the covering with the cover such that the entire instrument panel has to be unloaded again.

Moreover, as the conventional vehicle instrument panel, as described in Unexamined Utility Model Application No. Hei 1(1989)-152833 or Japanese Patent Laid-Open No. Hei 5(1993)-155271, a reinforcement made of an iron plate is provided in the inner side of a synthetic resin-made instrument panel to secure the strength and a duct connected to an air conditioner is routed around therein, thus supporting the duct on the reinforcement. Alternatively, a wire harness is allowed to follow the reinforcement and the like, thus supporting the wire harness by use of resin clips.

However, with the foregoing conventional constitution, the instrument panel is a decorated member, and since the reinforcement and the like disposed in the inner side thereof is a strength member made of an iron plate, the instrument panel becomes heavy. Thus, improvement thereof is required. Moreover, since a flexible air-conditioning duct and the wire harness are made to follow the reinforcement, a long sub assembly line before loading the instrument panel on an assembly line for the vehicle is necessary, thus resulting in a contributory cause of cost escalation. Also in the above point, the improvement of the instrument panel is required.

SUMMARY OF THE INVENTION

It is an object of the present invention to provide an instrument panel assembly capable of improving convenience of a vehicle.

Another object of the present invention is to provide an instrument panel assembly in which an insertion efficiency of the instrument panel from an opening of a door into a passenger room and maintenance efficiency thereof after being mounted in the vehicle are improved.

Another object of the present invention is to provide a light-weight instrument panel assembly which requires only a short sub assembly line.

Still another object of the present invention is to provide a simplified instrument panel assembly, which is composed of two components including a decorated member and a skeletal member.

In order to achieve the foregoing objects, a first aspect of the present invention is an instrument panel for a vehicle, comprising a duct assembly which is a composite made up with a vent duct disposed below of the instrument panel and a glove compartment.

By combining the vent duct and the glove compartment, the glove compartment can be provided in the instrument panel without increasing the number of items. Thus, the convenience of the vehicle can be enhanced at a low cost.

Moreover, the glove compartment may be provided in an upper-face part of the instrument panel at the front of a driver seat or/and a passenger seat. Moreover, the duct assembly may have two panels divided into an upper-half part and a lower-half part, the panels being manufactured by resin injection molding. Moreover, the duct assembly and a steering member may be integrally joined together.

Furthermore, vent air may be allowed to blow out into the inside of the glove compartment. Furthermore, a wire harness may be routed approximately in parallel with the steering member on a lower-face of the panel constituting the lower-half of the duct assembly.

According to the above-described structure, the glove compartment is located at the front of the driver seat and the passenger seat, which is user-friendly. Moreover, a structural body taking the steering member made of a steel plate as the impact receiver thereof is formed and can be applied to modularization of the instrument panel.

Moreover, an effect that articles housed in the glove compartment can be cooled or kept warm can be obtained. Particularly, there is an effect that refreshment beverage and the like can be put in the glove compartment and cooled therein in summertime.

Moreover, a wire routing path is simple and a wire routing time is shortened, thus enabling an inexpensive wire harness to be obtained. Moreover, the wire harness is securely fixed, and thus an effect that operations are rationalized without occurrence of abnormal noise and interference with other components is obtained.

An instrument panel of a second aspect of the present invention, includes: a module instrument previously assembled by a structural body capable of being fixedly provided onto a steering member and in which accessory components are previously supported, and a cover covering the structural body, in which the front to rear width of an entire body made of the structural body and the cover is smaller than that of an opening of a door; and a garnish molding detachably bridged between a front end portion of the module instrument and an upper-side edge portion of a cowl box.

In the garnish molding, a defroster outlet and a side defroster outlet may be formed. A rear end portion of the garnish molding may be supported so as to cover a front end portion of the cover of the module instrument from the top.

The structural body may be integrally formed by synthetic resin having at least a duct body connected to an air conditioner and a box surrounded by the duct body.

The front to end widths of the module instrument and the garnish molding after assembly thereof may be larger than that of the door opening.

According to the instrument panel of the second aspect of the present invention, there is only the module instrument having the front to rear width smaller than that of the door opening before the assembly into the car body, and thus an insertion efficiency of the instrument panel into the passenger room from the door opening can be improved.

Moreover, the garnish molding is detachably bridged between the front end portion of the module instrument and the upper-side edge portion of the cowl box. Thus, when the necessity of maintenance arises after mounting the instrument panel on the car body, a backside of the cover is exposed only by detaching the garnish molding. Therefore, the maintenance can be performed without detaching the instrument panel, thereby improving maintenance efficiency.

Moreover, the defroster outlet and the side defroster outlet are formed in one piece of garnish molding. Thus, other components are unnecessary, resulting in a low manufacturing cost.

Moreover, the rear end portion of the garnish molding is supported so as to cover the front end portion of the cover of the module instrument from the top. Thus, at the time of supporting the garnish molding, hammering thereinto from the top can be realized the structure mentioned above.

Furthermore, the structural body is integrally formed by synthetic resin having at least the duct body connected to the air conditioner and the box surrounded by the duct body. Thus, the strength is increased, and regardless of the structural body made of synthetic resin, various accessory components are supportable.

Furthermore, the front to rear widths of the module instrument and the garnish molding after the assembly into the car body become larger than that of the door opening.

An instrument panel of a third aspect of the present invention, includes: a synthetic resin-made air-conditioning duct body, which can be fixedly provided onto a steering member supported by a car body; a structural body integrally formed by box disposed at a position surrounded by the air-conditioning duct body; and a cover covering the structural body.

The air-conditioning duct body includes: a connection part connected to an air conditioner; and left and right duct bodies extended to the left and right from the connection part. On the air-conditioning duct, accessory components may be supported.

According to the instrument panel of the third aspect of the present invention, the air-conditioning duct body holds the box therearound, then integrally forming the instrument panel. Thus, the strength of the air-conditioning duct body is significantly improved and the instrument panel becomes a skeletal member capable of being fixedly provided in the steering member supported by the car body. Accordingly, a light-weight and simple instrument panel can be obtained.

Moreover, since the connection part of the air-conditioning duct body, which is disposed approximately at the center of the vehicle, is connected to the air conditioner, the air-conditioning duct body becomes integrated with the air conditioner. Thus, the strength thereof is further improved. Furthermore, because of the significant improvement of the strength of the air-conditioning duct body, the accessory components can be securely supported.

The air-conditioning duct body may include: the connection part connected to the air conditioner; and the left and right duct bodies extended to the left and right from the connection part.

The connection part of the air-conditioning duct body may include: a connection member formed by connecting the left and right duct bodies to a vent outlet of the air conditioner; a strength member bridging between the left and right duct bodies; and ribs extended to the front and end of the strength member and integrally formed onto the vent outlet. The air-conditioning duct body may be supported by being mounted on an upper portion of the steering member.

According to the instrument panel mentioned above, the air-conditioning duct body holds the box around, thereby integrally forming the instrument panel. Thus, the instrument panel becomes a skeletal member capable of being fixedly provided onto the steering member supported by the car body. Accordingly, a simplified instrument panel includes two components including a cover as a decorated member and the air-conditioning duct body as the skeletal member can be obtained.

Moreover, since the connection part of the air-conditioning duct body is connected to the air conditioner, the air-conditioning duct body is integrated with the air conditioner. Thus, the strength thereof is further improved. Moreover the left and right ducts extended to the left and right from the connection part hold the box around, thus significantly improving the strength of the air-conditioning duct body.

Moreover, since the connection part of the air-conditioning duct body is formed in a lattice manner of the connection member connected to the air conditioner, the strength member and the ribs, the strength of the connection part is significantly improved. Moreover, the member assigning the strength is integrated with the air-conditioning duct, thereby necessitating no other components. Thus, the manufacturing cost becomes low in price.

Furthermore, since the air-conditioning duct body is supported by being mounted on the upper portion of the steering member, the air-conditioning duct body can be temporarily held only by being mounted on the upper portion of the steering member. Thus, stability of the air-conditioning duct body when supported is significantly improved.

DETAILED DESCRIPTION OF THE PREFERRED EMBODIMENT (First Embodiment)

Figure 1:
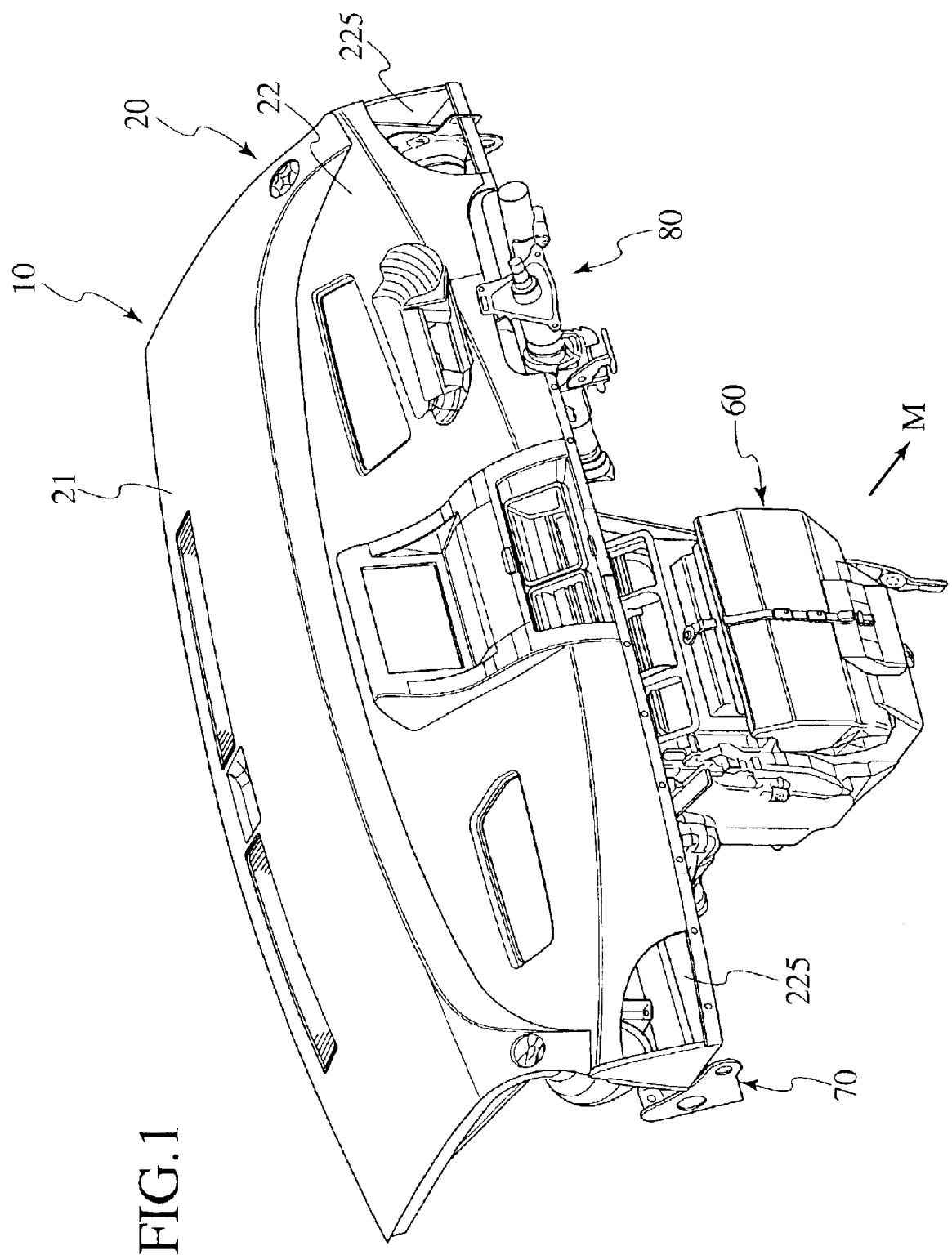
FIG. 1 is a perspective view of an instrument panel assembly according to a first embodiment of the present invention.
Figure 2:
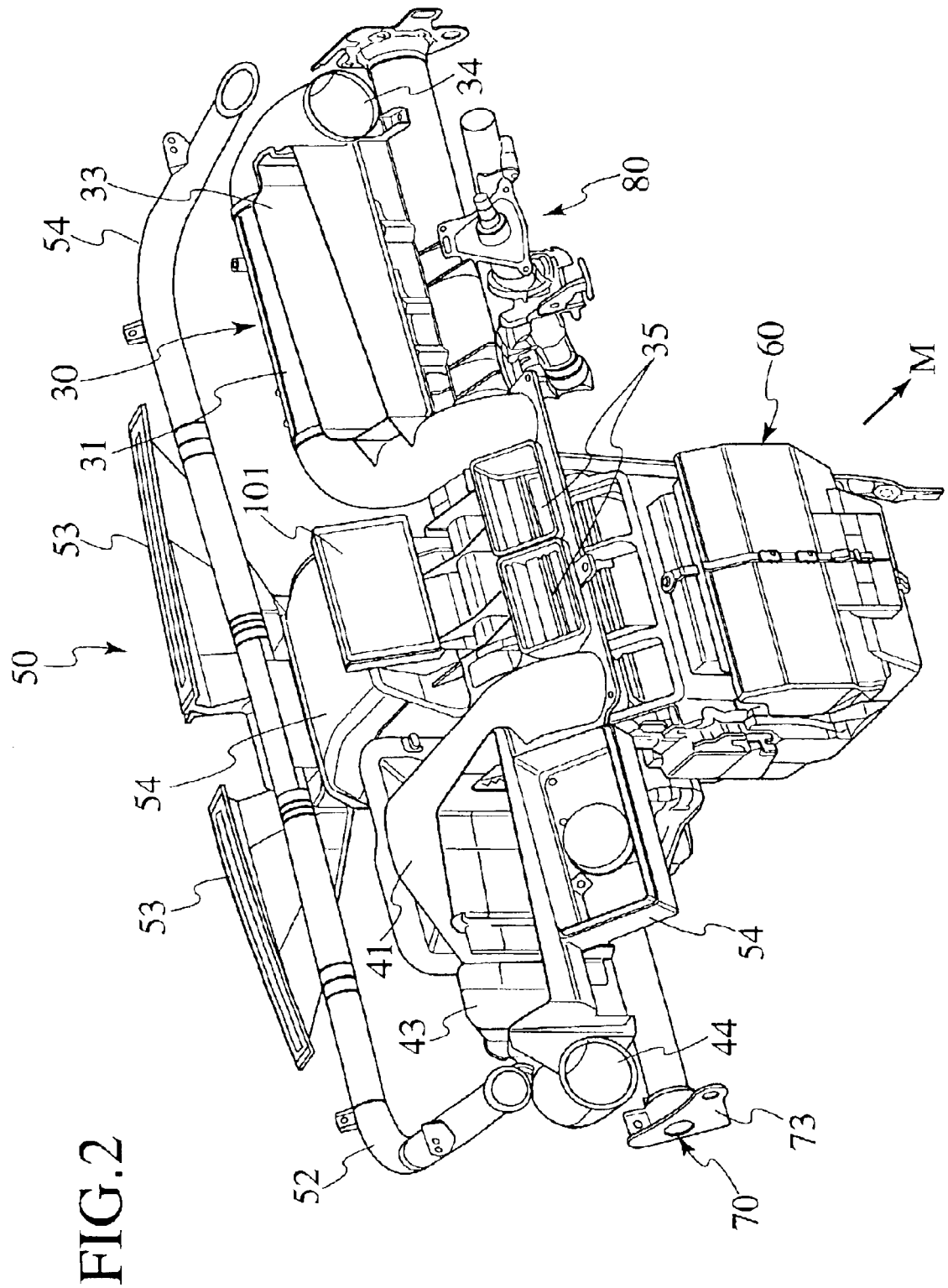
FIG. 2 is a perspective view (rear view) of the instrument panel assembly when an instrument panel is detached, according to the first embodiment of the present invention.
Figure 3:
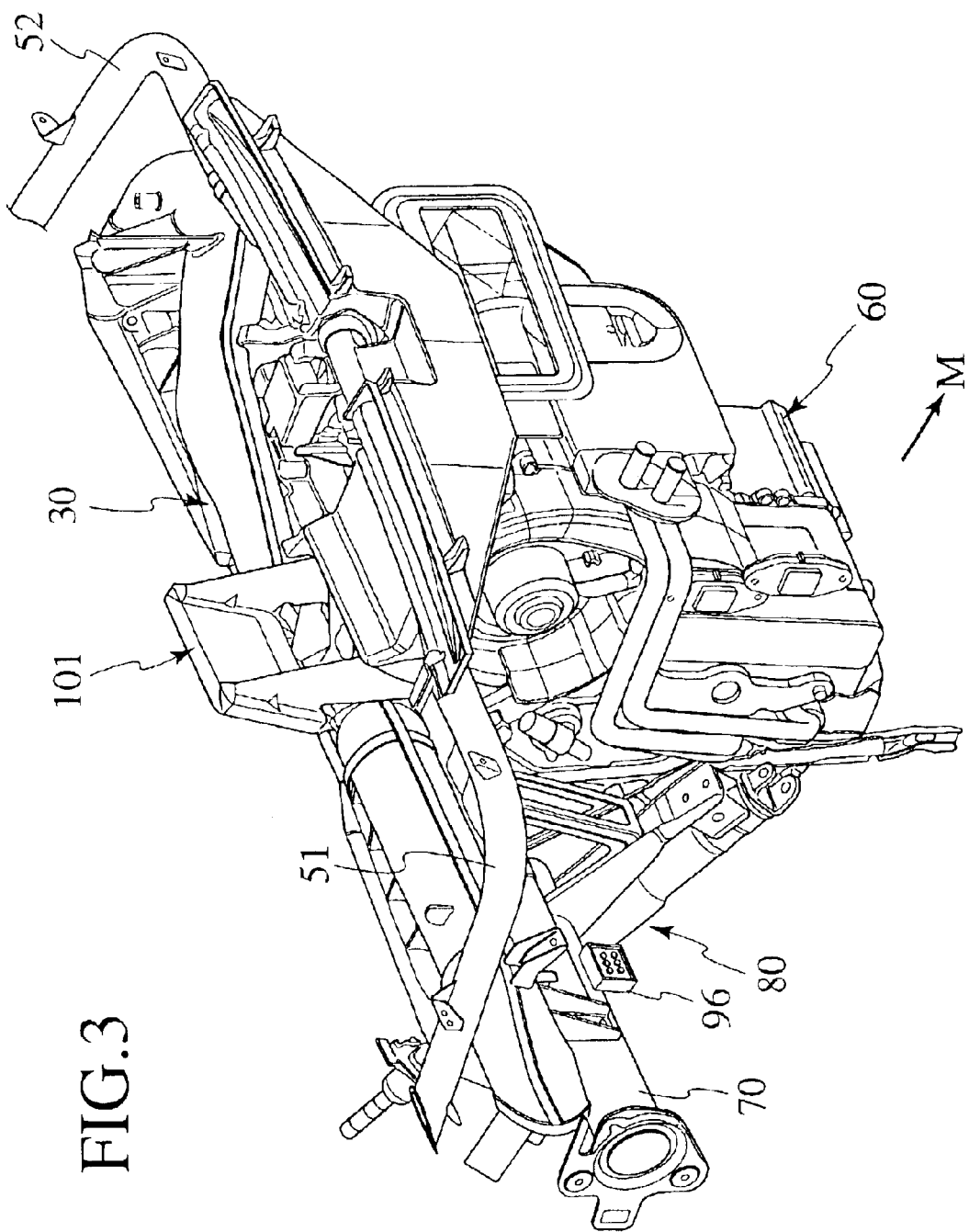
FIG. 3 is a perspective view (front view) of the instrument panel assembly when the instrument panel is detached, according to the first embodiment of the present invention.
Figure 4:
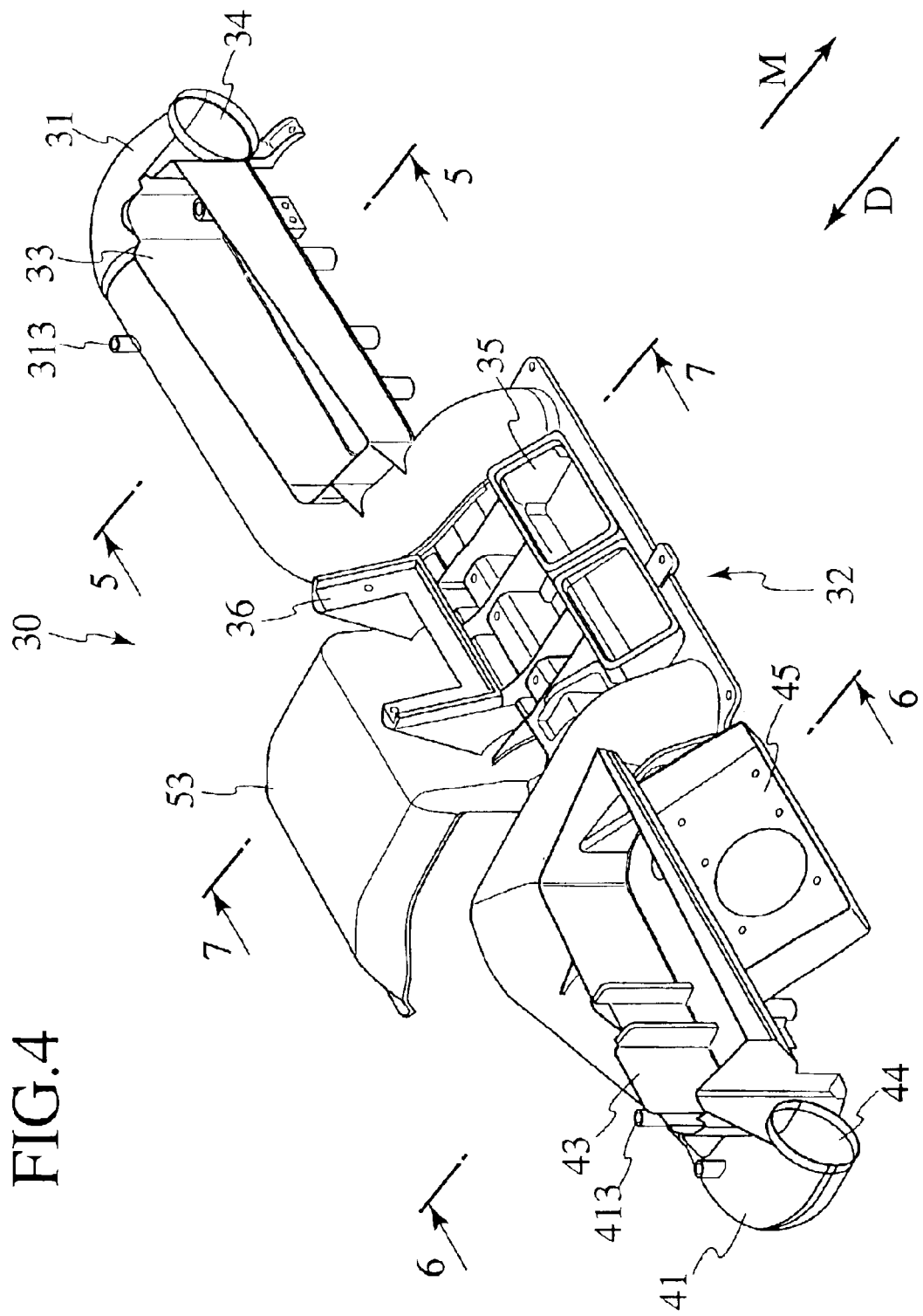
FIG. 4 is a perspective view (front view) of a duct assembly according to the first embodiment of the present invention.

FIG. 1 is a perspective view of an instrument panel assembly according to an embodiment of the present invention, FIG. 2 is a perspective view (rear view) of the instrument panel assembly when an instrument panel is detached, according to the embodiment of the present invention, FIG. 3 is a perspective view (front view) of the instrument panel assembly when the instrument panel is detached, according to the embodiment of the present invention, and FIG. 4 is a perspective view (front view) of a duct assembly according to the embodiment of the present invention.

In FIGS. 1 to 4, reference numeral 10 denotes an instrument panel assembly including: an instrument panel 20; a duct assembly body 30; a defroster 50; an air-conditioning unit 60; a steering member 70; a steering column 80; and an integral lower instrument panel (not shown) occupying from a driver seat part to a passenger seat part and being located at a lower back of the instrument panel 20 in front of crews.

The duct assembly body 30 includes left and right vent ducts 41 and 31 and an assembly central part 32 connected to the air-conditioning unit 60. At end portions of the left and right vent ducts 41 and 31, left and right outlets 44 and 34 are made open, which are connected to an air outlet opening 225 of the instrument panel 20. At a front side (in FIGS. 1 to 11, the arrow M direction, hereinafter also referred to as a "rear" and a direction opposite thereto is referred to as a "front") of the assembly central part 32, there are central outlets 35 of vent air, and a monitor 101 is attached to an upper front thereof. In a further front thereof, a blowing duct 54 communicating with left and right side defroster nozzles 52 and 51 and front defroster nozzles 53 and 53 is formed, all of which are connected to the blowing duct.

Moreover, in an area located in front of the driver seat at the rear of the right vent duct 31 and in an area located in front of the passenger seat at the rear of the left vent duct 41, glove compartments 33 and 43 are respectively provided integrally with the vent ducts.

Note that, in order to enhance an efficiency of a housing space at a lower portion of the instrument panel 20, the left and right vent ducts 41 and 31 are disposed by being brought as close to a backside of the instrument panel 20 as possible.

Moreover, the duct assembly body 30 itself has an enough rigidity to be able to retain its shape. However, the duct assembly body 30 is fixed to the steel-made steering member 70, and the air-conditioning unit 60 and the steering column 80 are further fixed to the steering member 70. On the result structure thus obtained, a back instrument panel 22 is mounted to be broadened, and the lower instrument panel (not shown) is mounted to be broadened to the lower back.

Reference numeral 73 denotes a stay that connects the steering member 70 to a car body floor for strengthening thereof.

Figure 5:
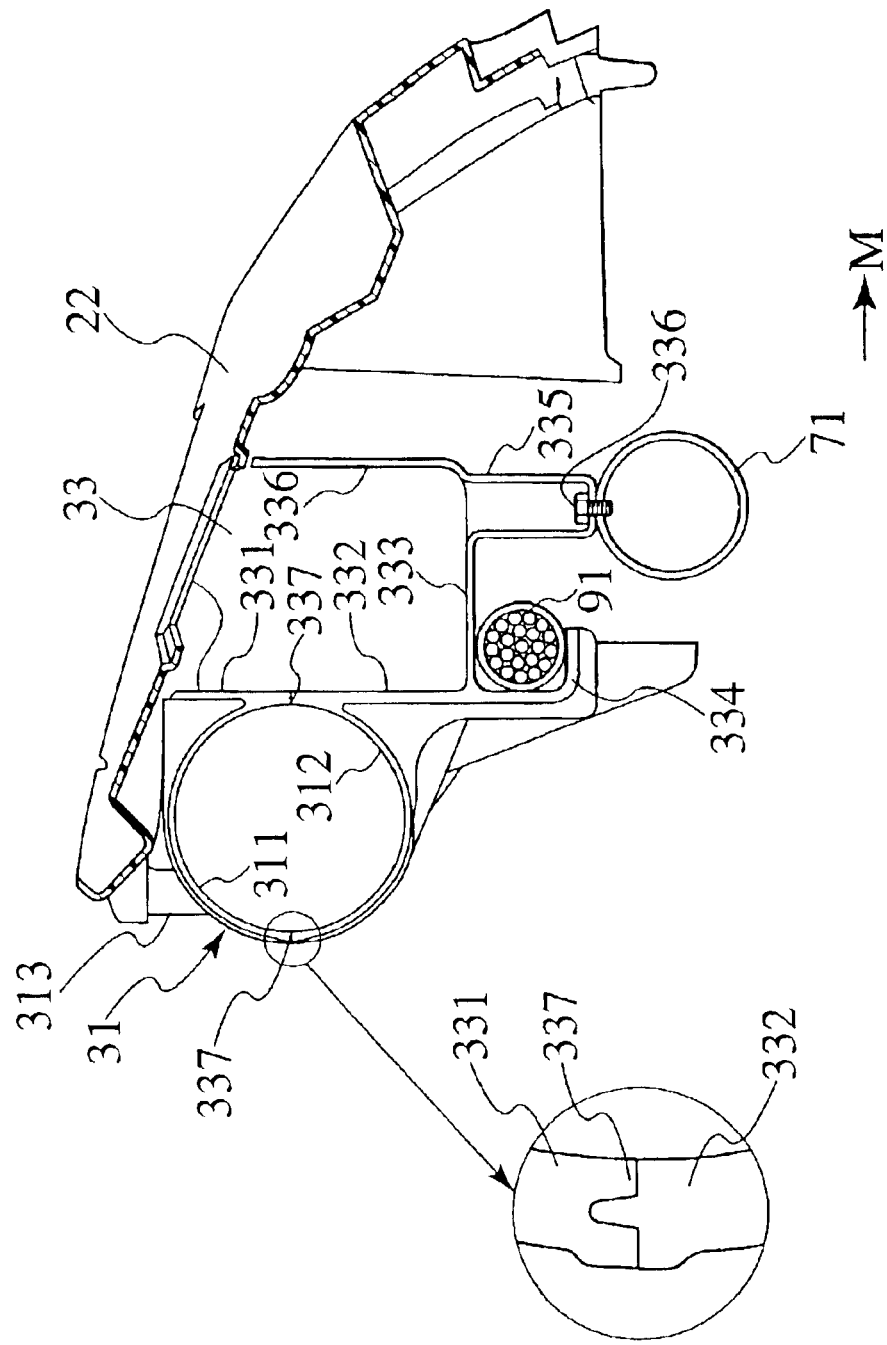
FIG. 5 is a cross-sectional view along the line 5—5 of FIG. 4.
Figure 6:
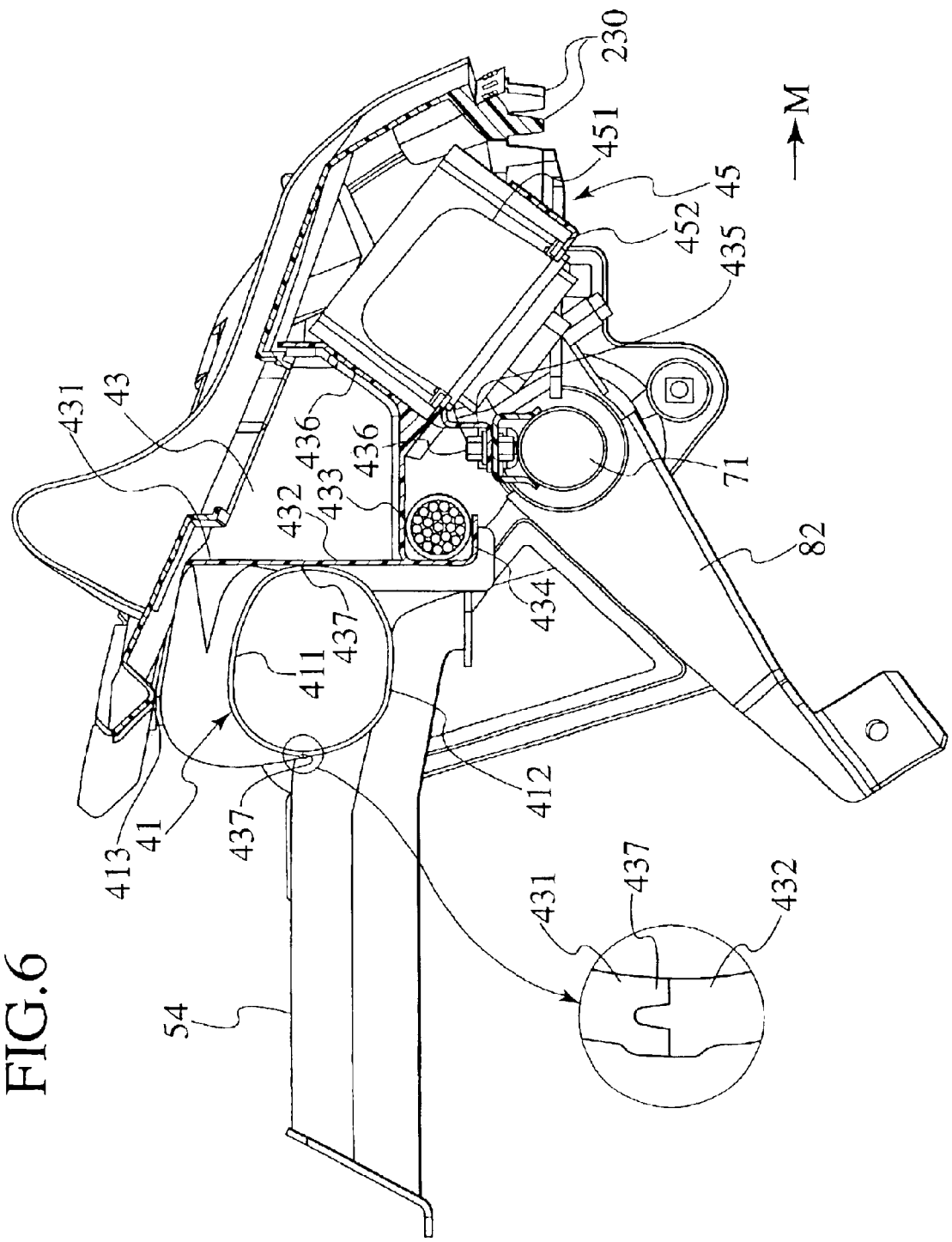
FIG. 6 is a cross-sectional view along the line 6—6 of FIG. 4.
Figure 7:
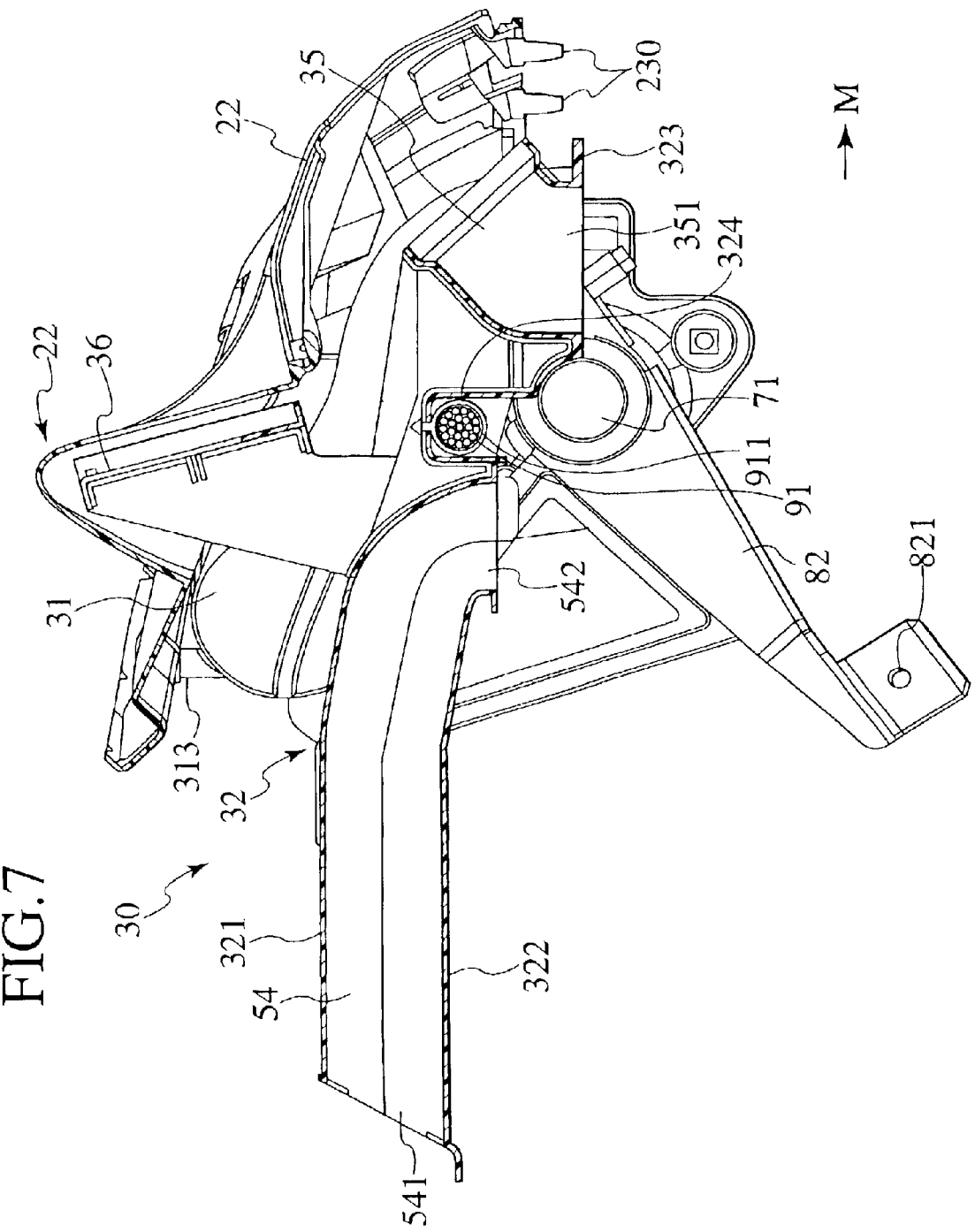
FIG. 7 is a cross-sectional view along the line 7—7 of FIG. 4.

FIG. 5 is a cross-sectional view along the line 5—5 of FIG. 4, FIG. 6 is a cross-sectional view along the line 6—6 of FIG. 4 and FIG. 7 is a cross-sectional view along the line 7—7 of FIG. 4. Hereinafter, the constitution of the instrument panel assembly 10 according to the embodiment will be described further in detail.

In FIG. 5, the cross section shown in the drawing is positioned at the driver seat, and the duct assembly body 30 is divided into two, upper-half and lower-half portions. As the lower-half portion thereof, a lower-half portion 312 of the right vent duct 31, the lower-half portion 312 having a semicircle cross section, and the glove compartment 33 having a horseshoe cross section at the rear of the lower-half portion 312 are integrally molded by resin injection.

Moreover, a wire harness fixation part 334 with an L-shaped cross section and an attachment part 335 with a horseshoe cross section, which has an opening on its top for fixing to the main body of the steering member 71 by use of a bolt, are formed downward from a bottom face 333 of the glove compartment 33. The attachment part 335 is fixed to the main body of the steering member 71 by use of a bolt 336 from the above. A wire harness main line 91 is pushed into the wire harness fixation part 334. The wire harness fixation part 334 and the wire harness main line 91 are set to have sizes such that, due to elastic deformation of the fixation part 334 and the wire harness main line 91, the wire harness main line 91 is never separated from the wire harness fixation part 334.

Moreover, in the upper-half portion of the duct assembly body 30, an upper-half portion 311 of the right vent duct 31 with a semicircle cross section and a part 331 of a vertical wall of the glove compartment 33 located at the rear of the portion 311 are integrally molded by resin injection and are joined with a lower vertical wall 332 of the glove compartment 33 by a faucet joint 337, and divided portions in the front are fixed by a plurality of screws (not shown).

Reference numeral 313 denotes an attachment part for fixing the back instrument panel 22 to the right vent duct 31. The glove compartment 33 is positioned between the right vent duct 31 and the steering member 71 in the back of the right vent duct 31 and is positioned above the steering member 71.

Next, the cross section shown in FIG. 6 is located at the passenger seat. In the lower-half portion obtained by dividing the duct assembly body 30 into two, upper-half and lower-half, a lower-half portion 412 of the left vent duct 41, which has a semicircle cross section, and a glove compartment 41 in the back thereof are integrally molded by resin injection. Specifically, the glove compartment 41 has an opening on its top and has an approximately horseshoe cross section.

Moreover, a wire harness fixation part 434 with an L-shaped cross section is formed downward from a bottom face 433 of the glove compartment 43. In the back of the glove compartment 43, an airbag case 45 is integrally formed on a slant with the glove compartment 43.

Moreover, an airbag 451 is housed and fixed in the airbag case 45, and a steel-made bracket 435 is fixed in a screwed state onto a bottom face 452 of the airbag case 45 by use of bolts for fixing the airbag 451. The other end of the bracket 435 is fastened and fixed to the steering member main body 71 by use of a bolt 436. A wire harness main line 91 is pushed into the wire harness fixation part 434.

The wire harness fixation part 434 and the wire harness main line 91 are set to have sizes such that, due to elastic deformation of the fixation part 434 and the wire harness main line 91, the wire harness main line 91 is never separated from the wire harness fixation part 434.

Moreover, at the back of the upper-half portion 411 of the left vent duct 41, which has a semicircle cross section, a part 431 of a vertical wall of the glove compartment 43 is formed and is joined with a lower vertical wall 432 of the glove compartment 43 by a faucet joint 437, and divided portions in the front are fixed by a plurality of screws.

Reference numeral 413 denotes an attachment part for fixing the back instrument panel 22 to the left vent duct 41 (see FIG. 4).

Next, the cross section shown in FIG. 7 is located in the center of the vehicle. The assembly body central part 32 of the duct assembly body 30, which is mounted above the air-conditioning unit, includes two divided portions, upper-half and lower-half portions, by resin injection.

The lower-half portion of the assembly central part 32 forms a bottom plate 322 of the blowing duct 54, and the upper-half portion thereof communicates with a base part 323 forming a ceiling part 321 of the blowing duct 54, a wire harness fixation part 324 and central outlets.

An opening 542 at the rear end of the blowing duct 54 forms an inlet of defroster air, which is connected to the air-conditioning unit main body 61, and an opening 541 at the front end thereof forms an outlet of defroster air, which is connected to the front defroster nozzles.

The wire harness fixation part 324 has a horseshoe cross section that is open downward, and the wire harness main line 91 is fixed to the wire harness fixation part 324 at its concave portion by use of a resin-made clip 911, thus preventing the wire harness main line 91 from dropping off therefrom. Moreover, in the upper-half portion of the assembly central part 32, a downward protrusion portion is formed between the wire harness fixation part 324 and the central outlet 35. By allowing an arc portion 325 at the tip of the protrusion to abut on the steering member main body 71, the joint between the duct assembly body 30 and the steering member 70 is strengthened.

An opening 351 in the lower portion of the central outlet 35 forms an outlet of vent air, which is connected to the air-conditioning main body 61. Reference numeral 36 denotes a monitor bracket formed to protrude into the back of the ceiling of the blowing duct 54, and the monitor 101 is fixed thereon (see FIG. 2).

Reference numeral 82 denotes a steel-made bracket welded to the steering member main body 71, and a hole 821 in the lower end thereof forms a bolt hole for supporting a steering column main body 81. By another bracket (not shown) welded to the steering member main body 71 similarly to the foregoing bracket 82, the steering column 80 is supported by the steering member main body 71 at both of its upper and lower ends (see FIGS. 1 and 2).

Figure 8:
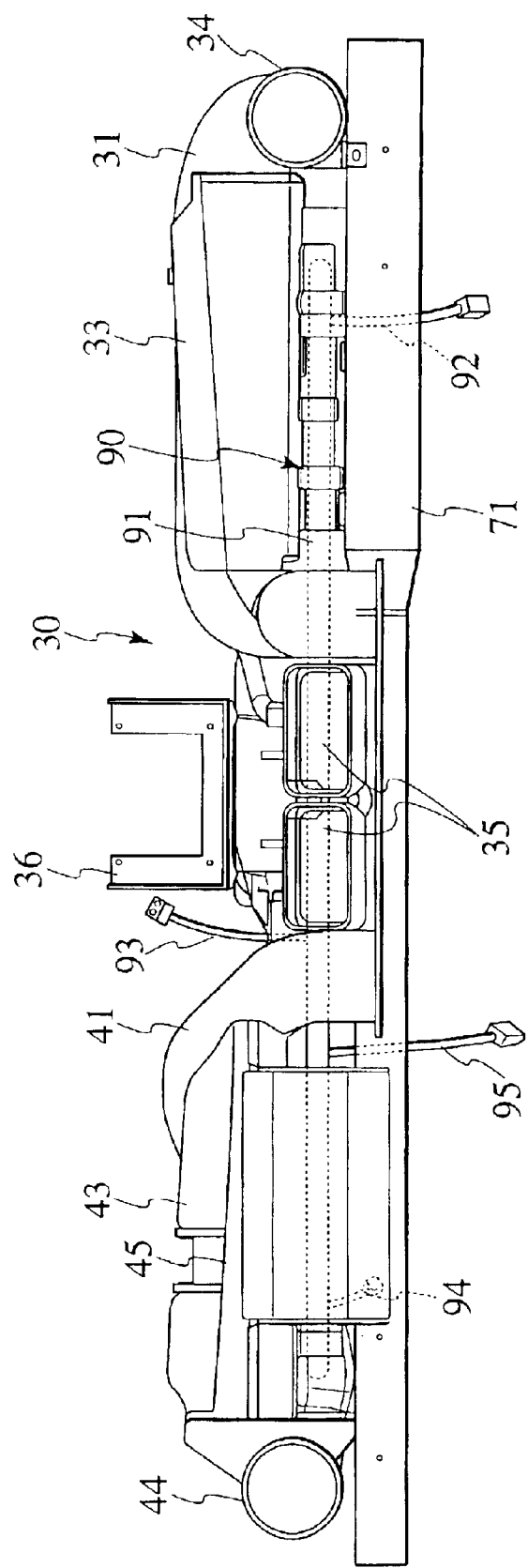
FIG. 8 is a front view (front view, a steering member attached) of the duct assembly according to the first embodiment of the present invention.

FIG. 8 is a front view of the duct assembly body according to the embodiment of the present invention (front view, the steering member attached) and shows a wire routing situation of the wire harness 90. In FIG. 8, the wire harness 90 is routed approximately in parallel with the steering member main body 71 and, as described above, is fixed to the duct assembly body 30 by the wire harness fixation parts 334 and 434 and the clip 911.

Branch lines 92, 93, 94 and 95 are branched off from the main line 91, which are connected to various devices, respectively.

Specifically, the branch line 92 is connected to a combination switch, an ignition switch, a meter and the like; the branch line 93 to a center monitor, an audio equipment (not shown) and the like; the branch line 94 to the airbag; and the branch line 95 to the air-conditioning unit. Moreover, at a right end or a left end or both ends of the main line 91, the main line 91 is connected to a vehicle body wire harness (not shown) by a self-locating connector 96 (FIG. 3).

Figure 9:
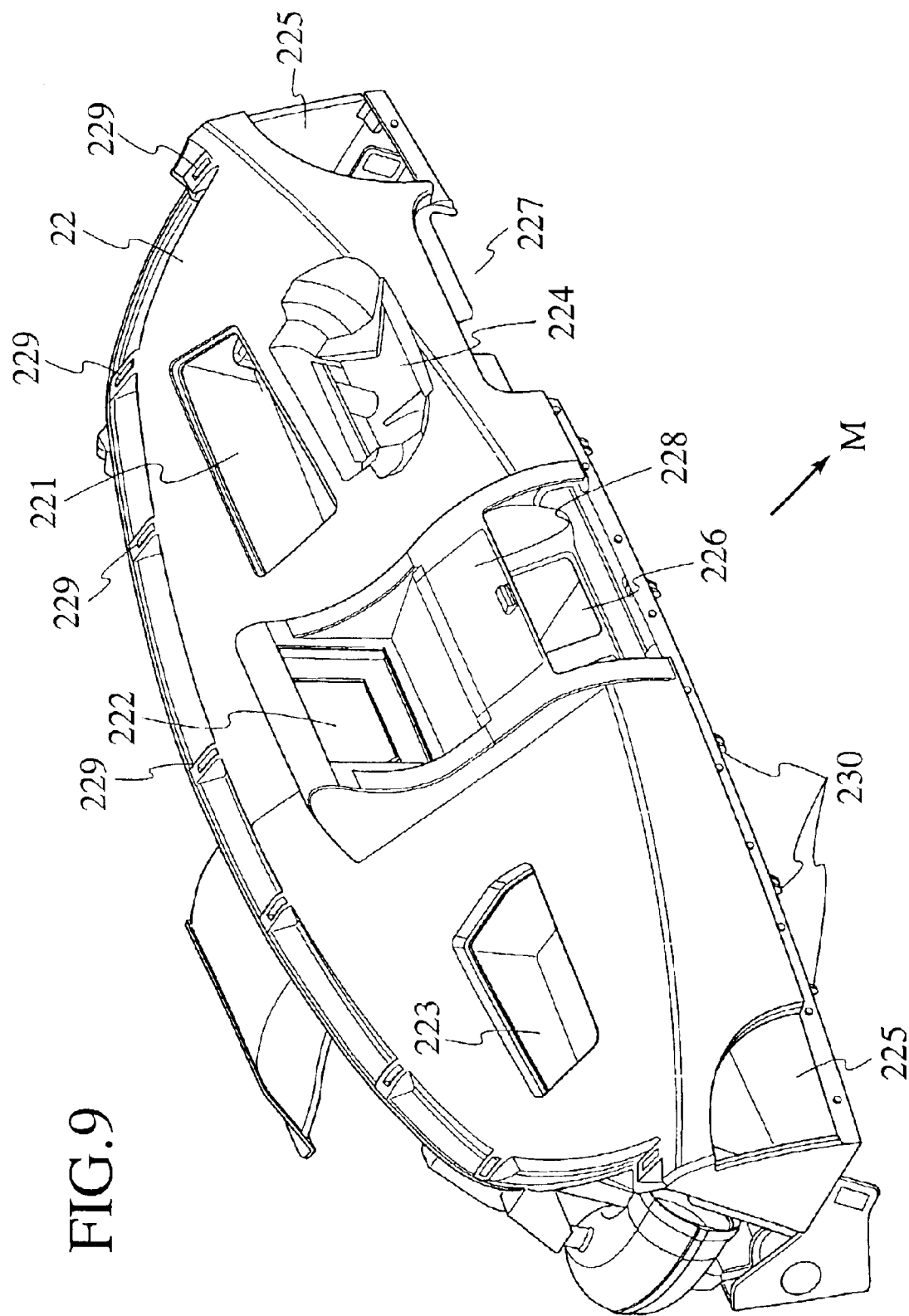
FIG. 9 is a rear perspective view of the duct assembly (the steering member attached), to which a back instrument panel (an instrument module) is mounted to be broadened, according to the first embodiment of the present invention.

FIG. 9 is a rear perspective view after unfolding and attaching the back instrument panel 22 to the duct assembly body (the steering member attached) according to the embodiment of the present invention. In FIG. 9, reference numeral 221 denotes a glove compartment opening at the side of the driver seat; 222 an opening of the center monitor; 223 a glove compartment opening at the side of the passenger seat; 224 an opening of a meter attachment portion; 225 a side outlet opening of the vent air; 226 a central outlet opening of the vent air; 227 a notch for attachment of the steering column 80; 228 a central glove compartment; 229 square holes for inserting resin-made clips fixed at the side of the front instrument panel 21 when attaching the front instrument panel 21 to the back instrument panel 22; and 230, joint pins when attaching the lower instrument panel (not shown) to the back instrument panel 22.

Lids (not shown) are attached to the glove compartment openings 221 and 223, and ventilator grilles (not shown) are attached to the left and right outlet openings 225 of the vent air and the central outlet opening 226 thereof.

Next, description will be made for a characteristic point of attachment of the instrument panel assembly 10 to the vehicle according to the embodiment.

First, the air-conditioning unit 60 and the steering column 80 are attached to the steering member 70. Meanwhile, after the upper-half and lower-half portions of the duct assembly body 30, which are individually injection-molded, are aligned with each other by the faucet joints 337 and 437, the upper-half and lower-half portions are assembled into the duct assembly body 30 by being fastened by screws (not shown), and then the wire harness 90 is attached thereto (FIGS. 5 to 8). Thereafter, the duct assembly body 30 having the wire harness 90 attached thereto is attached to the steering member 70 having the air-conditioning unit 60 and the steering column 80 attached thereto, and then the side defroster nozzles 51 and 52, the front defroster nozzles 53 and 53 and the center monitor 101 are attached thereto. Subsequently, the back instrument panel 22 is attached to the resultant structure, and the branch lines 92 to 95 of the wire harness 90 are connected to their respectively related electrical devices.

Furthermore, the lower instrument panel (not shown), which is integrally molded by the resin injection remaining from the driver seat to the passenger seat, is aligned by the joint pins 230 of the back instrument panel 22 and is fastened by screws (not shown) to be brought into the vehicle room on the assembly production line, as the instrument panel assembly 10. Then, several spots at the both ends of the steering member 70, such as the brackets 73 and 73, the stay 72 and the like, are fastened by bolts and fixed to the vehicle body.

Thereafter, the front instrument panel 21 (or garnish molding) is attached to the back instrument panel 22 by inserting the resin-made clips (not shown) attached to the front instrument panel 21 into the square holes 229 and circle holes (not shown) on the vehicle side. By omitting the front instrument panel 21 from the final instrument panel assembly and attaching the same separately in the last step on the production line, an insertion space of tools used in fastening the instrument panel assembly to the brackets of the vehicle body by use of bolts is secured. Thus, the operations are facilitated.

According to the above-described constitution, the duct assembly body 30 includes the two panels, which are divided into the upper-half and lower-half portions made by the resin injection molding, the left and right vent ducts are integrally molded in the left and right directions with the central portion interposed therebetween, and the lower-half portion of the vent duct, which has a circle cross section, and the glove compartment are integrally molded in the area of the driver and passenger seats in the longitudinal direction. Thus, the number of items is small, the attachment of the components thereof is easy and the resultant product is cheap. Moreover, since the number of the steering member 70 and the dedicated brackets are reduced and the bolt joints are adopted, a high rigidity is secured. Thus, an instrument panel structural body is excellent in the viewpoint of abnormal noise and collision safety.

Moreover, the glove compartments 33 and 34 are formed by molding integrally with the left and right vent ducts 41 and 31 and are also provided in front of the driver seat and the passenger seat. Thus, the convenience of the vehicle can be enhanced at a low cost.

Moreover, the wire harness 90 is routed approximately in parallel with the steering member 70 by use of the resin brackets integrally provided in the lower part of the duct assembly body 30 and the resin-made clips 911. Thus, the wire routing path is simple and the wire routing time is shortened, thereby enabling a cheap wire harness to be obtained. Moreover, the secure fixation of the wire harness brings about an effect that the wire routing operation is rationalized without occurrence of abnormal noise and interference with the other components.

Moreover, as a part of the attachment of the duct assembly body 30 to the steering member 70, the attachment part 335 having opening on its top and a horseshoe cross section is formed on the bottom face of the glove compartment 33. Thus, when attaching the duct assembly body 30 to the steering member 70, fastening the glove compartment from the opening thereof is made possible, thus enabling assembly workability to be improved.

Figure 10:
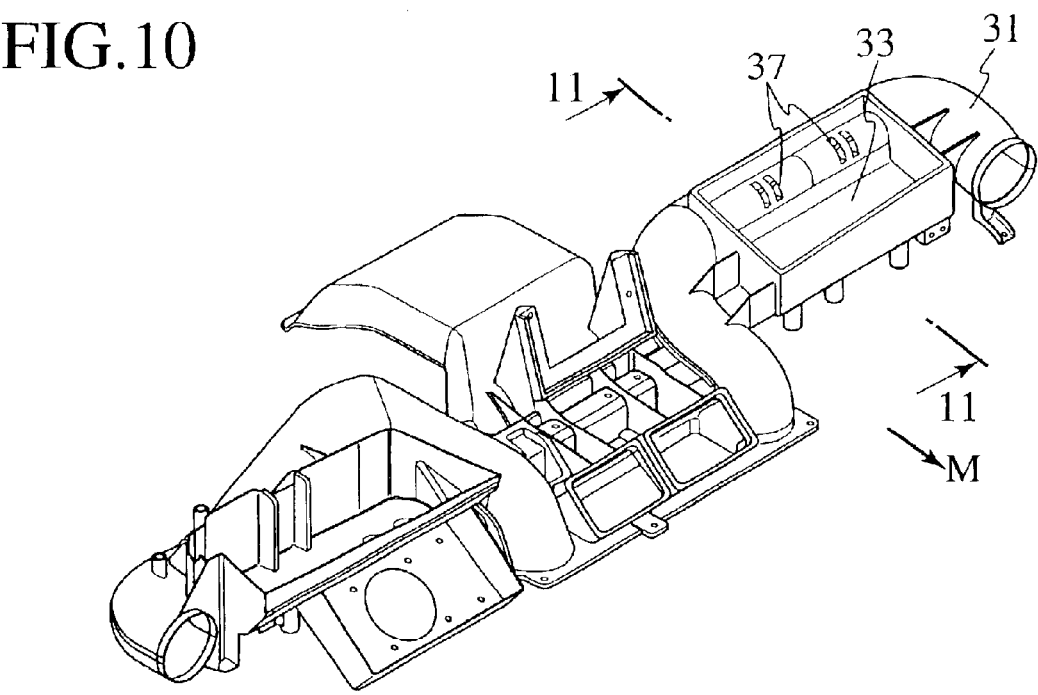
FIG. 10 is a rear perspective view of a duct assembly according to another example of the first embodiment of the present invention.
Figure 11:
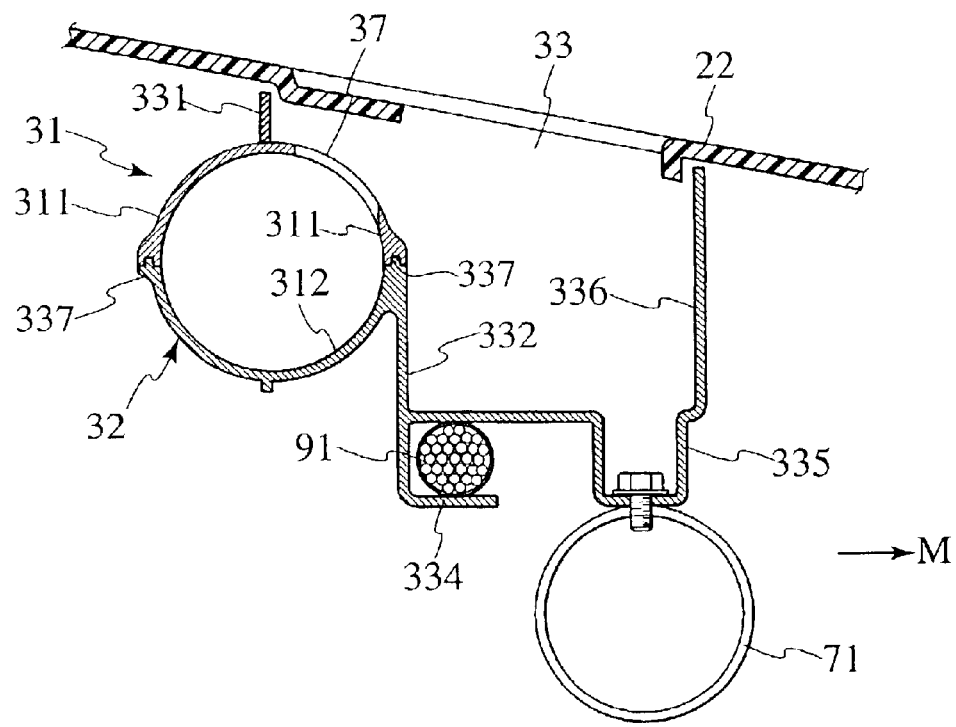
FIG. 11 is a cross-sectional view along the line 11—11 of FIG. 10.
Figure 12:
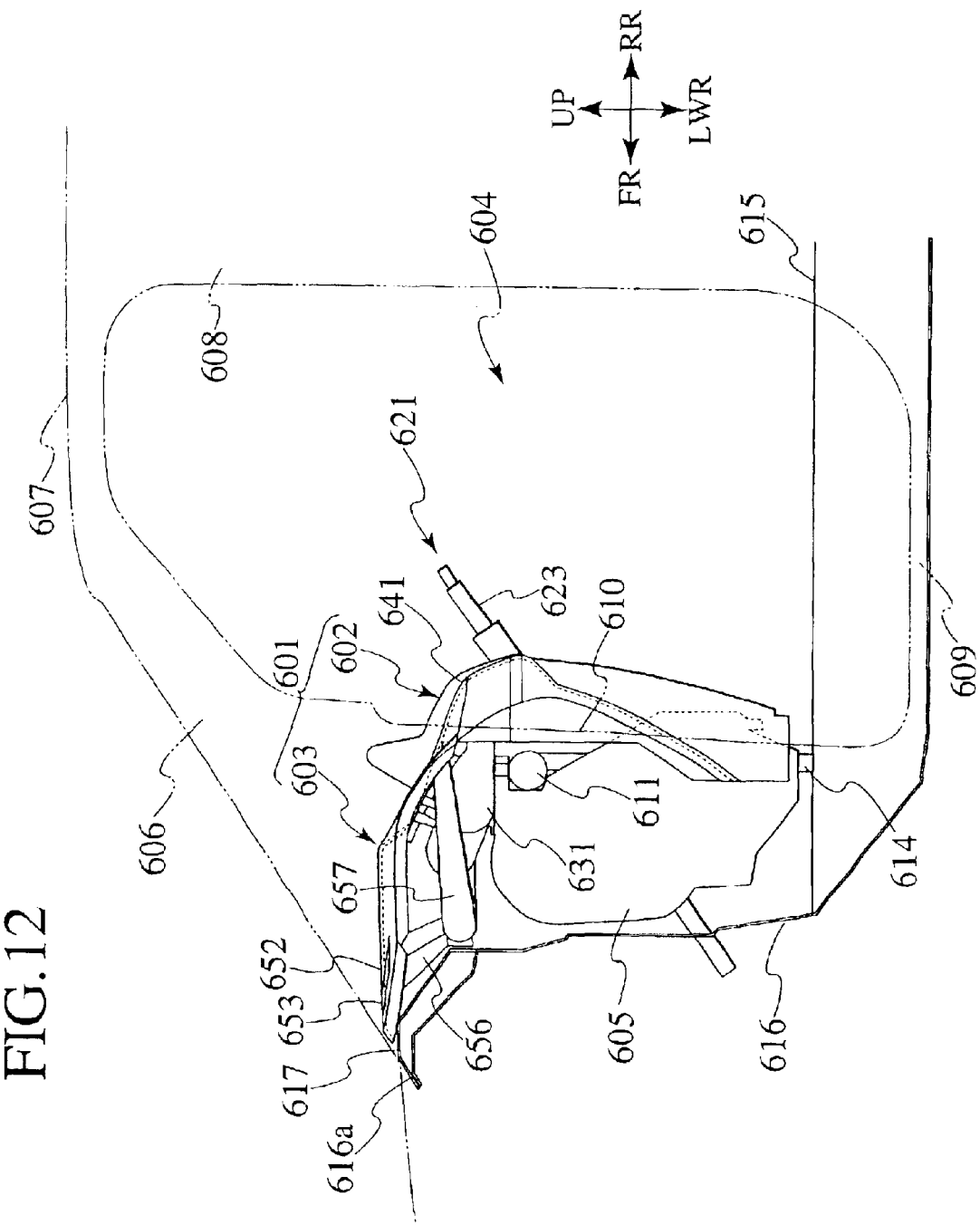
FIG. 12 is a side view of an instrument panel assembly mounted on a vehicle, showing a second embodiment of the present invention.
Figure 13:
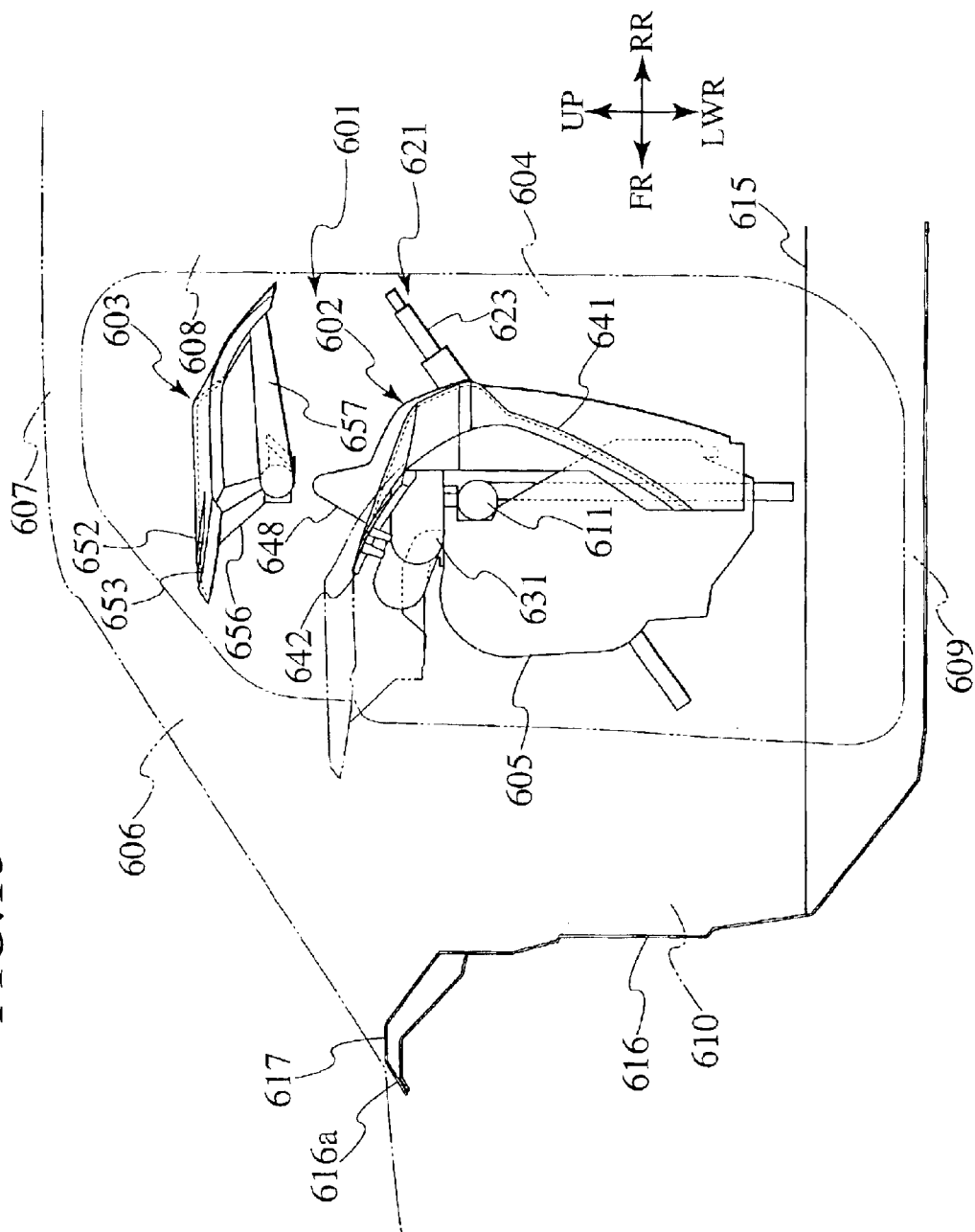
FIG. 13 is a side view showing a relationship between the instrument panel assembly of FIG. 12 and a door opening.
Figure 14:
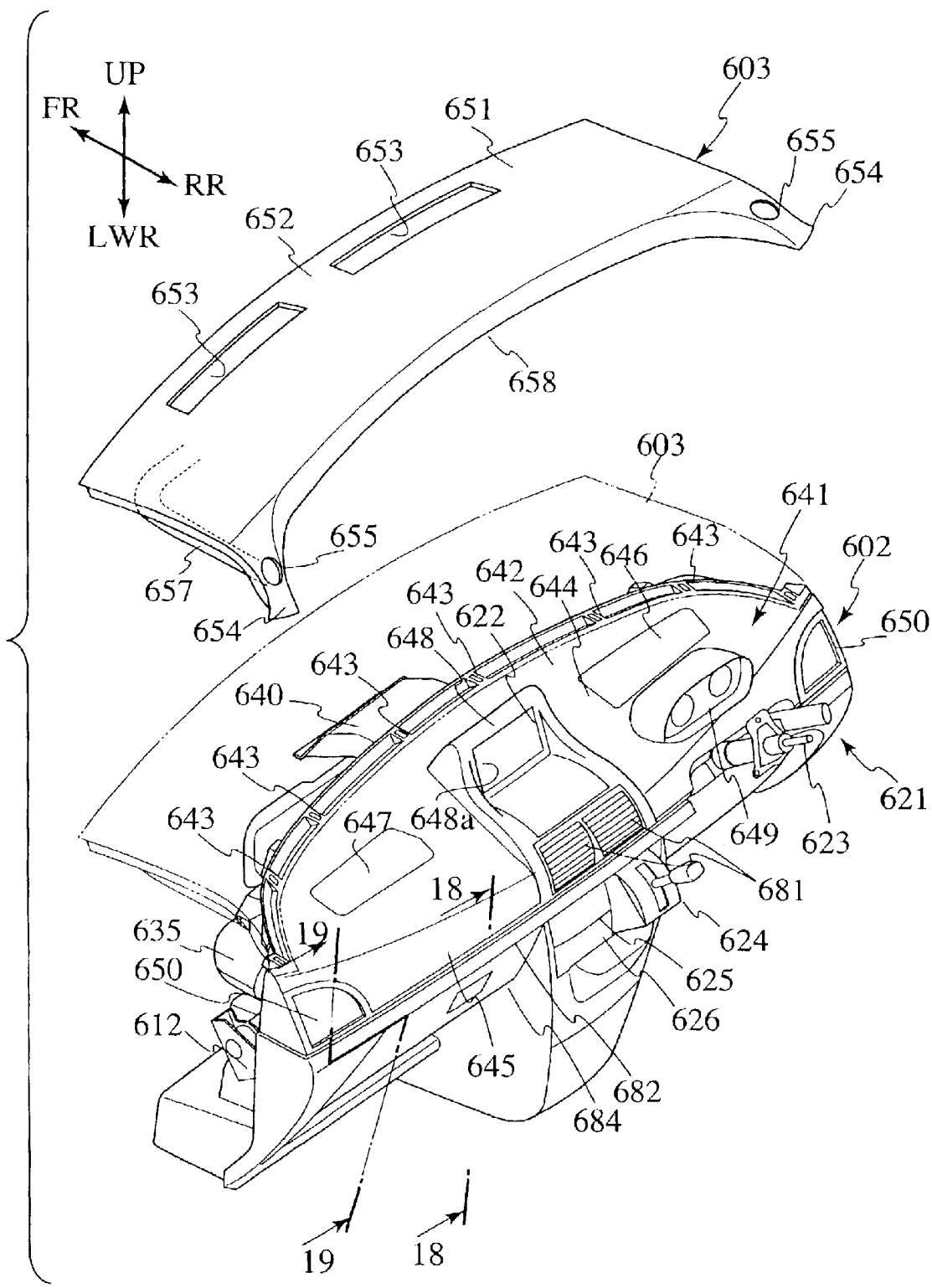
FIG. 14 is an exploded perspective view of the instrument panel assembly of FIG. 12.
Figure 15:
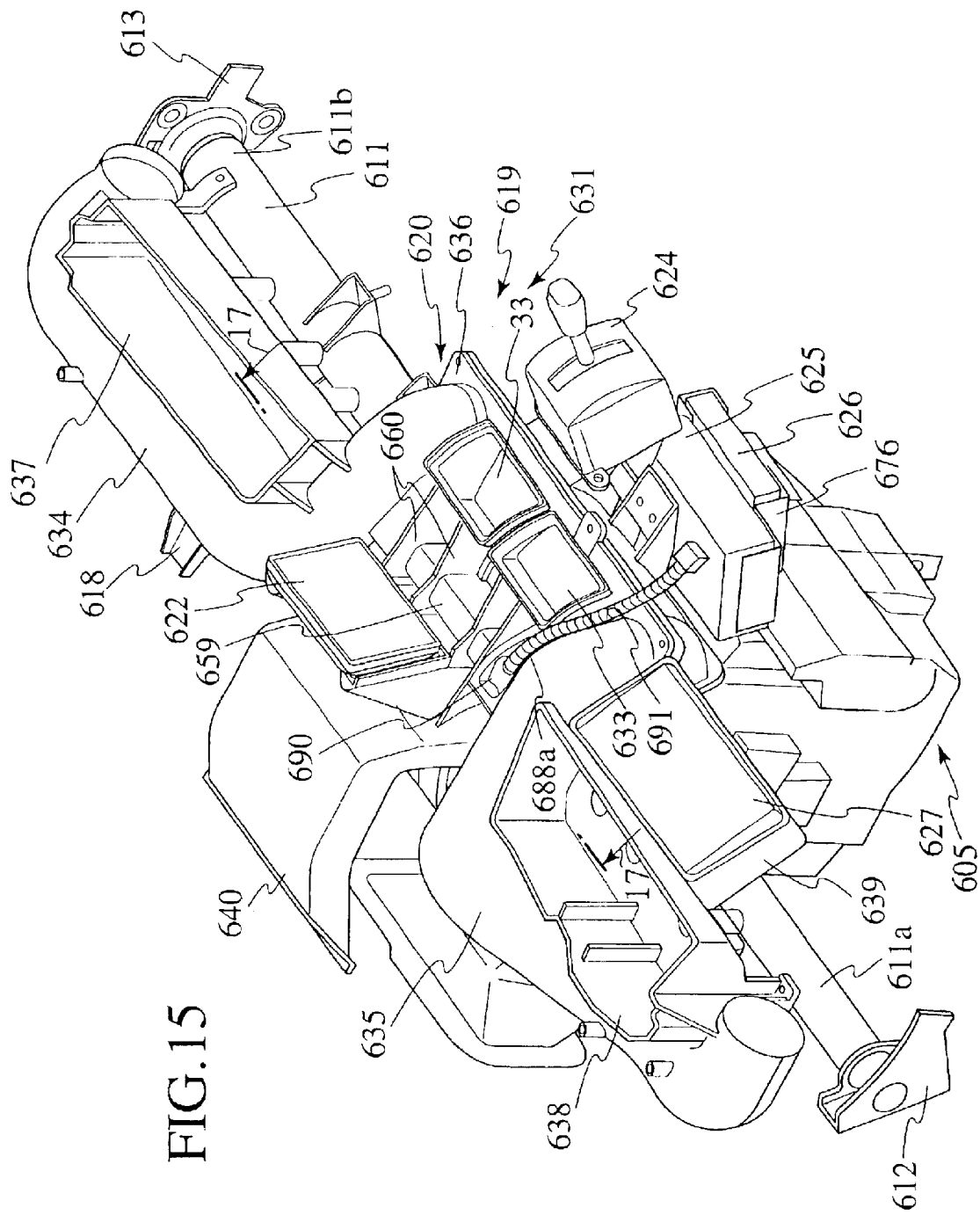
FIG. 15 is a perspective view of a duct assembly of FIG. 14.
Figure 16:
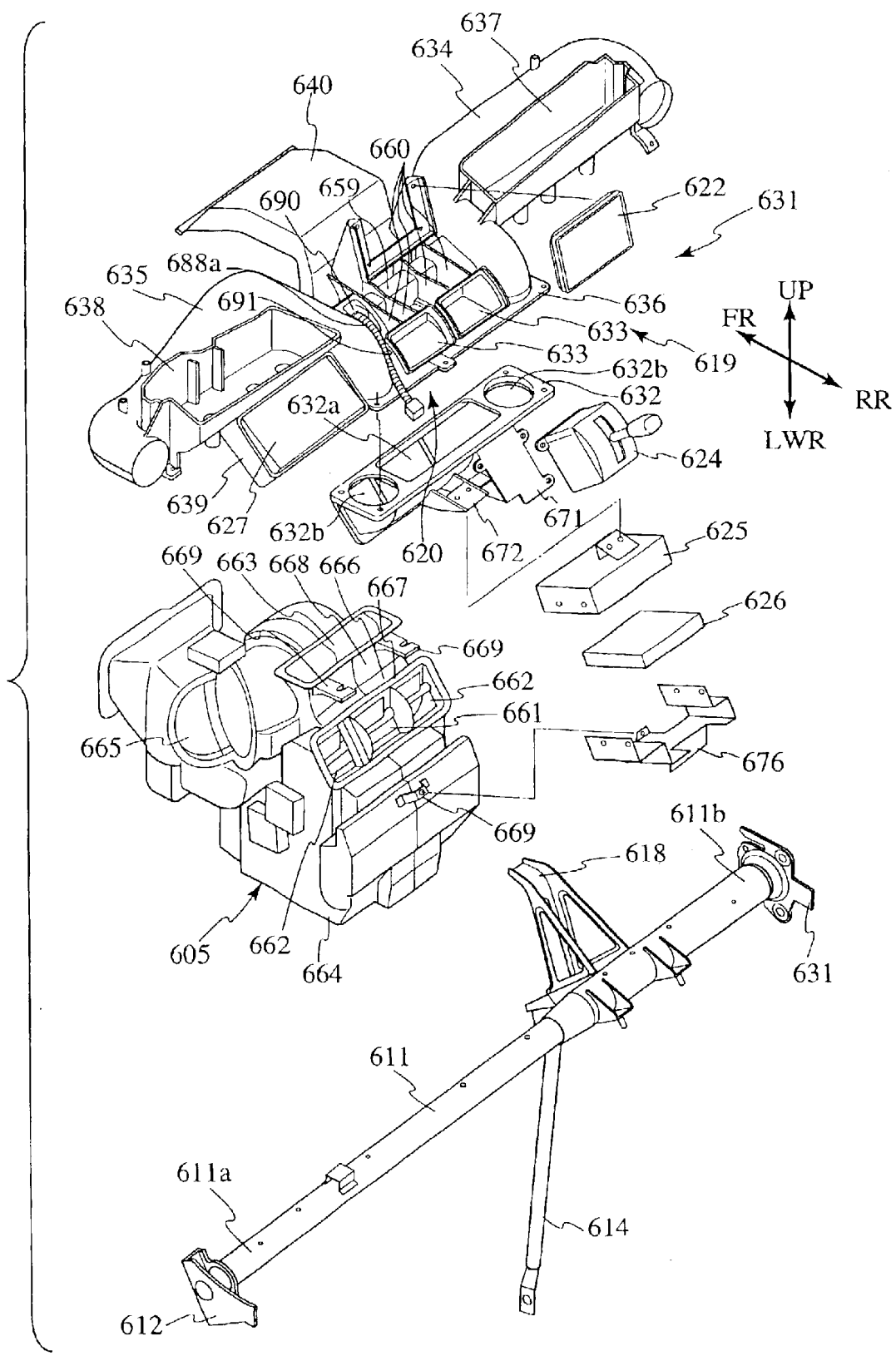
FIG. 16 is an exploded perspective view of FIG. 15.
Figure 17:
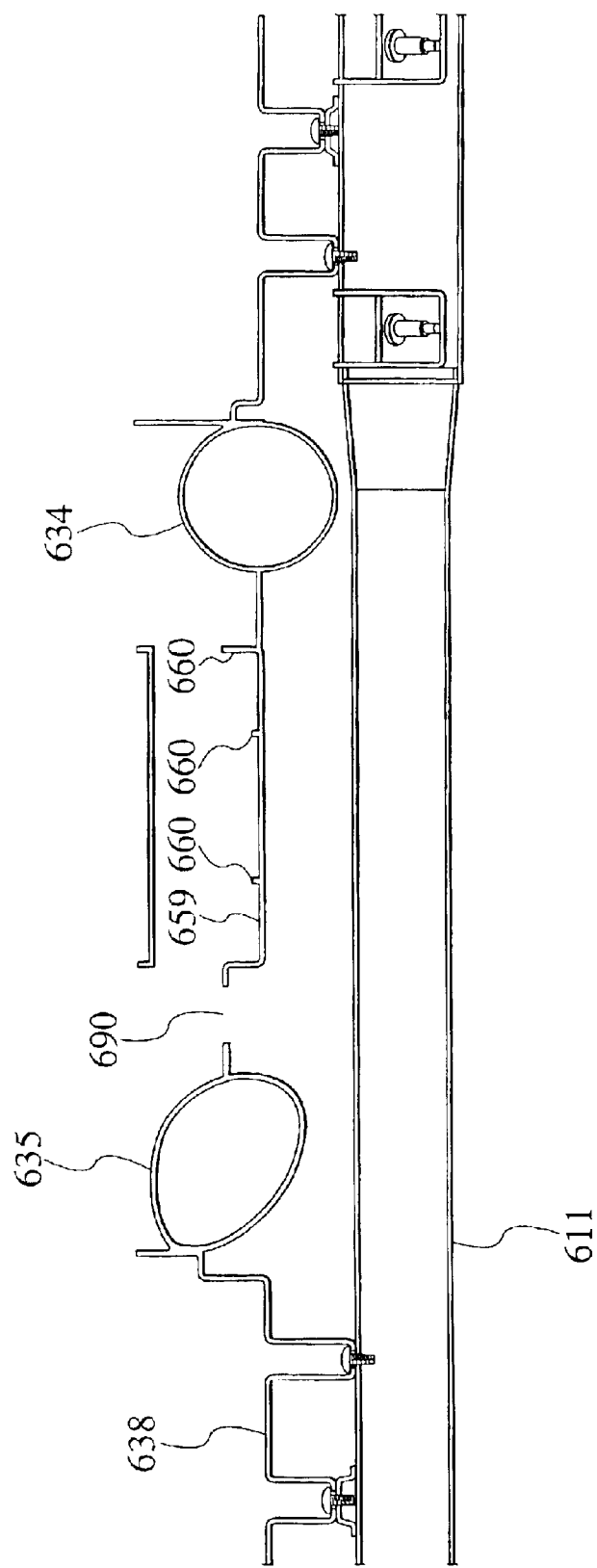
FIG. 17 is a cross-sectional view along the line 17—17 of FIG. 15.
Figure 18:
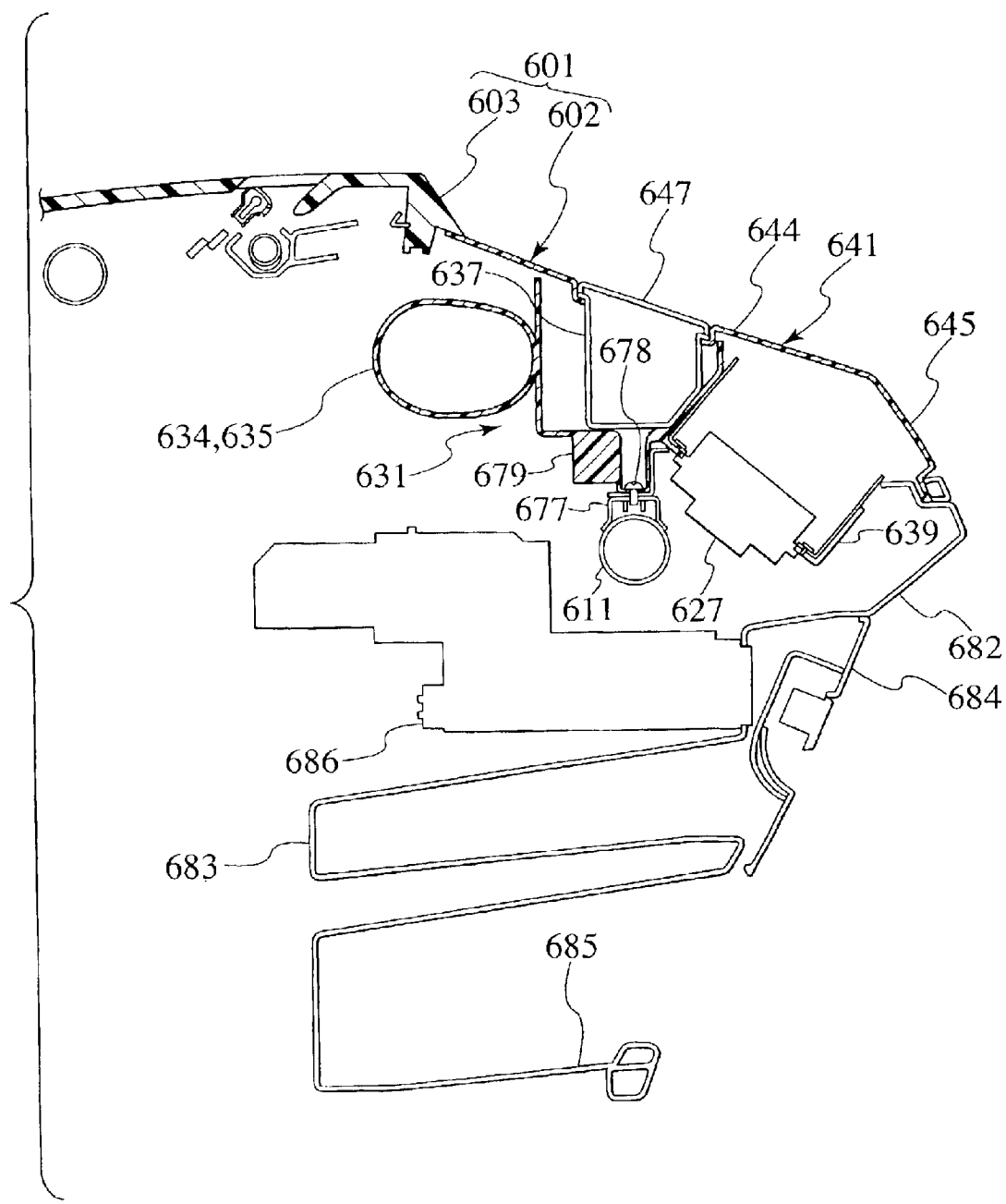
FIG. 18 is a cross-sectional view along the line 18—18 of FIG. 14.
Figure 19:
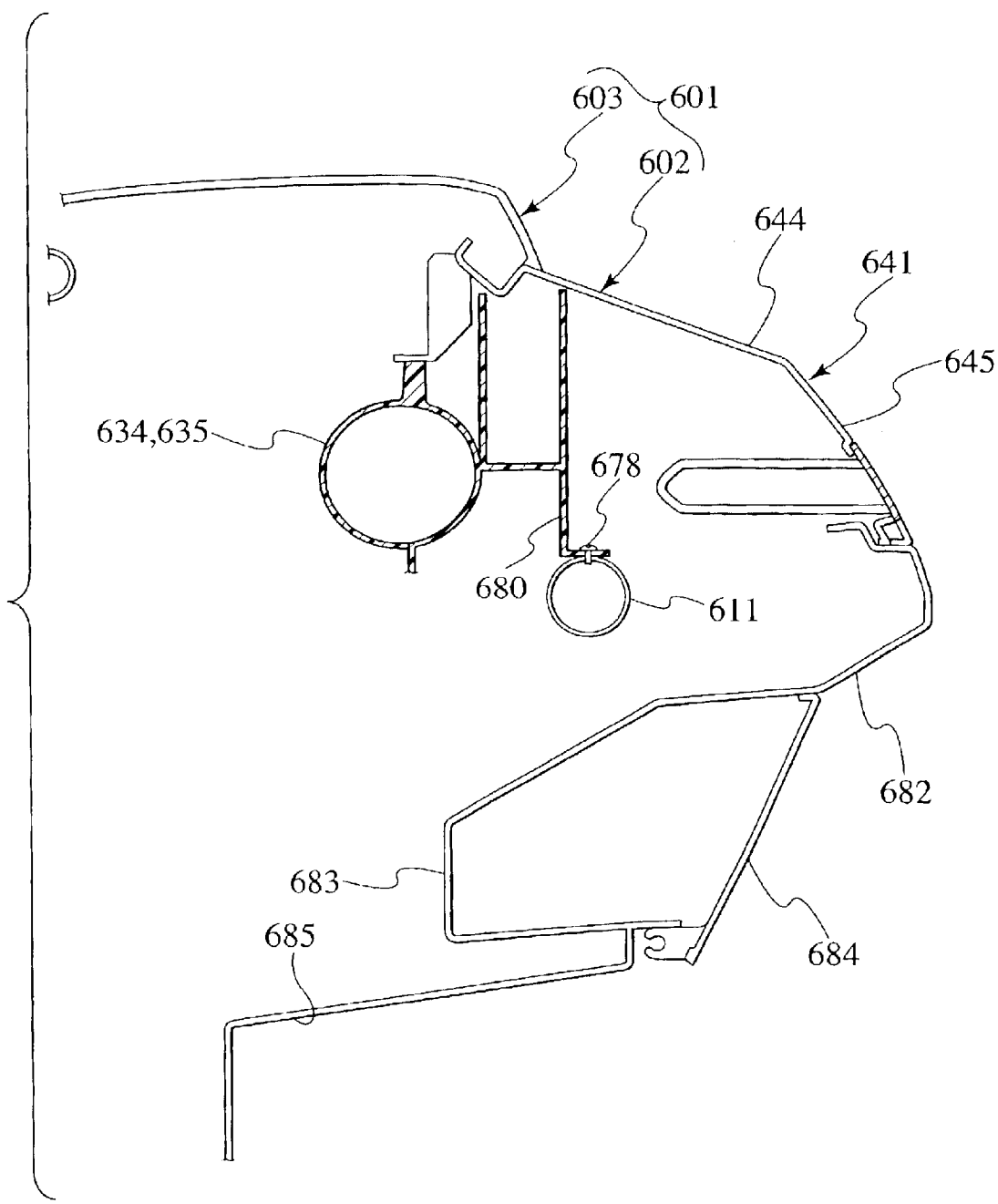
FIG. 19 is a cross-sectional-view along the line 19—19 of FIG. 14.

FIG. 10 is a rear perspective view of a vent duct assembly body according to another modified example of the first embodiment of the present invention, and FIG. 11 is a cross-sectional view along the line 11—11 of FIG. 10. With reference to FIGS. 10 and 11, other modified example will be described below. In this embodiment, the front vertical wall 331 of the glove compartment at the driver seat side is provided approximately in an uppermost portion of the upper-half portion 311 of the right vent duct 31, and a plurality of slit outlets 37 are provided at the side of the glove compartment 33 of the upper-half portion 311 thereof. The point other than the above is the same as the foregoing embodiment. Thus, corresponding components are denoted by the same reference numerals and detailed description thereof will be omitted.

Because of the outlets 37 provided, the vent air passes through the glove compartment 33 and blows out into the vehicle room through the glove compartment opening 221 of the back instrument panel 22 and through a gap between an upper edge of the glove compartment 33 and a lower face of the back instrument panel 22. Thus, articles housed in the glove compartment 33 can be cooled or kept warm. Particularly, there is an effect that refreshment beverage and the like can be put in the glove compartment and cooled therein in summertime.

Regarding the outlets 37, it is easy to perform the following: to provide open/close valves therein; to provide a net therein; to increase the size thereof; to increase the number of slits thereof; to change the position thereof; and to increase/decrease the amount of the vent air passing through the glove compartment 33 by providing vent air outlets, such as slits and the like, in the vertical wall 337 of the glove compartment 33. Moreover, the outlets can be easily provided in the glove compartment 45 at the side of the passenger seat.

Moreover, it is preferable to provide lids in the glove compartments in the view point of springing out of the housed articles and window reflections. In the glove compartments, partitioning plates may be provided in consideration for characteristics of the housed articles such as shapes thereof and the like. Thus, convenience thereof can be further enhanced.

Moreover, the central portion of the lower-half panel can be divided in consideration of the number of units produced and molds. It is possible to arbitrarily apply the resultant one obtained by attaching the upper instrument panel to the resultant one obtained by integrally joining the duct assembly body and the steering member to the module instrument.

Moreover, it is easy to provide outlets in correspondence with the inlets of the vent air, to increase/decrease the size thereof, accordingly to provide the open/close valves or the net in the inlets or the outlets.

(Second Embodiment)

With reference to FIGS. 12 to 19, a second embodiment of the present invention will be described below.

Reference numeral 601 denotes a vehicle instrument panel assembly including a instrument module 602 and a garnish molding 603. The front to rear width size after assembling the instrument module 602 and the garnish molding 603 becomes larger than that of a door opening 604. The door opening 604 means an opening formed on the vehicle body in order to open/close a well-known door not shown in the drawing and includes constituent components, including a front pillar 606, an upper side rail 607, a center pillar 608, a side sill 609 and a front pillar lower panel 610.

The instrument module 602 can be fixedly provided on a steering member 611 and is formed by previously assembling a structural body 631 supporting accessory components 21 and a cover 641 (i.e., an instrument panel) covering the structural body 631. Moreover, a front to rear width size of the structural body 631 and the entire cover 641 is smaller than that of the door opening 604.

The steering member 611 is formed to have a shape of a hollow round bar long enough to be cross-linked between the front pillar lower panels 610 and 610. On both ends 611a and 611b of the steering member 611, brackets 612 and 613 are supported by welding. The brackets 612 and 613 are fastened and supported on the front pillar lower panels 610 and 610 by bolts and the like (not shown). Reference numeral 614 denotes a stay supporting the steering member 611 from below in such a manner that an upper end of the stay 614 is fixedly provided approximately in the center of the steering member 611 and a lower end thereof is fastened and supported on a tunnel 615 in a floor of the vehicle by bolts and the like. Reference numeral 618 denotes a bracket supporting the steering member 611 from above on an upper edge 616a of a well-known cowl box 616.

Between a front end 642 of the cover 641 that is a "front end" of the instrument module 602 and the upper edge 616a of the cowl box 616, the garnish molding 603 is detachably bridged so as to cover from the upper side UP. Specifically, engaging parts 643 and 617 are formed in plural in the front end of the cover 641 and the upper edge 616a of the cowl box 616, and the garnish molding 603 is supported by engaging bosses (not shown) thereof with the engaging parts 643 and 617. In the engaging parts 643 and 617, spring-shaped stoppers (not shown) for nipping the bosses therebetween are disposed.

The garnish molding 603 includes a synthetic resin-made main body 651 in a flat plate shape. In a front end at the front side FR of the main body 651, defroster outlets 653 are formed, and a rear end 658 at the rear side RR of the main body 651 is disposed such that the rear end 658 rides on the cover from the upper side UP of the front end 642 of the cover 641. At the rear side RR of both left and right ends of the main body 651, projecting members 654 are formed. In the projecting members 654, side defroster outlets 655 are formed. At the backside of the garnish molding 603, front defroster nozzles 656 and side defroster nozzles 657 are supported. The front defroster nozzles 656 communicate with the defroster outlets 656, and the side defroster nozzles 657 communicate with the side defroster outlets 655. Moreover, according to the need, on the backside of the garnish molding 603, electrical devices, including a head-up display unit, a head-up display controller, a unit combined ETC antenna and the like, can be mounted.

The structural body 631 is integrally formed by use of a synthetic resin material, which includes: a base 632 communicating with a central vent outlet 661 of an air conditioner 605 and left and right vent outlets 662 and 662 thereof, all of which are disposed in the left, right and center of the vehicle, via a central opening 632a and left and right openings 632b and 632b; a central member 636 in which central vent outlets 633 and left and right duct bodies 634 and 635 are joined together, which communicate with the central vent outlet 661 and the left and right vent outlets 662 and 662 of the air conditioner 605 via the base 632; boxes 636 and 637 surrounded by the hollow ducts 634 and 635 extending to the central member 636 and the left and right ends of the vehicle; an airbag storage 638 formed in the rear side RR of the left duct 637; and a ventilation duct having its lower end communicated with a central defroster outlet 663 of the air conditioner 605 via the central member 636 and having its upper end communicated with the front defroster nozzle 656. The ducts 634 and 635 are formed as reinforcement members. Thus, a support rigidity of the front end 642 of the cover 641 is improved, and there is no influence upon mounting of the garnish molding 603 from the upper side UP.

The structural body 631 is integrally formed of a synthetic resin-made duct assembly 619 (corresponding to the duct assembly of the first embodiment) capable of being fixedly provided in the steering member 611 and the boxes 637 and 638 disposed at the position to be held by the duct assembly 619. Moreover, the structural body 631 can support the accessory components 621.

The duct assembly 619 includes a connection part 620 connected to the air conditioner 605 disposed approximately in the center of the left and right direction of the vehicle and the left and right duct bodies 634 and 635 extending to the left and right from the connection part 620.

Reference numeral 632 denotes the base. The lower portion of the base is connected to the central vent outlet 661 of the air conditioner 605 and the left and right vent outlets 662 and 662 thereof, all of which are disposed in the left, right and center of the vehicle respectively. The central opening 632a and the left and right openings 632b and 632b in the upper portion of the base communicate with the respective vent outlets 661 and 662.

The connection part 620 is integrally formed of: the connection member 636, in which the central vent outlet 661 of the air conditioner 605 and the central defroster outlet 663 are joined to the left and right ducts 634 and 635 via the base 632; the central vent outlets 633 and 633 communicating with the central vent outlet 661 of the air conditioner 605 and the left and right vent outlets 662 and 662 thereof; a strength member 659 bridging between the left and right duct bodies 634 and 635; a plurality of ribs 660 that extend to the front and rear of the strength member 659 and are integrally formed in the front of the central vent outlet 633; a ventilation duct 640 having its lower end communicated with the central defroster outlet 663 of the air conditioner 605 via the connection member 636 and having its upper end communicated with the front defroster nozzle 656. Reference numeral 690 denotes a through-hole formed in the strength member 659, which is for allowing a branch line 688a of a wire harness (not shown) disposed in the backside of the strength member 659 to come out to the front from the through-hole 690.

Meanwhile, the left and right duct bodies 634 and 635 are extended while being branched off in the left and right directions, respectively, after being extended out to the front side FR from the connection member 636 of the connection part 620. Furthermore, the ducts 634 and 635 are formed to have an approximately horseshoe shape with an opening in the rear side RR when viewed in the form of a top view, of which tip openings are bent so as to face toward the rear side RR (to the front side of the passenger). The boxes 637 and 638 having openings on the upper side UP integrally form the duct bodies 634 and 635, thus obtaining a constitution in which the left and right ducts 634 and 635 hold the boxes 637 and 638. Then, the strength member 659 of the connection part 620 is positioned so as to be approximately in alignment with the boxes 637 and 638 in the vehicle width direction, thus enhancing a bending rigidity in the vehicle width direction of the connection part 20. Furthermore, the plurality of ribs 660 intersecting with the strength member 659 have their front ends connected to a back wall of the ventilation duct 640 and have their rear ends connected to a front wall of the central vent outlet 633, respectively. Thus, the bending rigidity in the front to rear direction of the connection part 620 is enhanced.

At the rear side RR of the left box 638, the storage 639 of the airbag unit 627 is disposed. Inside the storage 639, the airbag unit 627 is stored.

The ducts 634 and 635 are formed as the reinforcement members. Thus, the support rigidity of the front end 642 of the cover 641 is improved, and there is no influence upon mounting of the garnish molding 603 from the upper side UP. Moreover, the duct bodies 634 and 635, as shown in FIGS. 6 and 7, include a fitting piece 679, which is mounted on the bracket 677 installed fixedly on the upper portion of the above mentioned steering member 611 by welding, or a fitting piece 680, which is mounted on the upper portion of the above mentioned steering member 611 and supported by screws 678.

The cover 641 includes a planar upper member 644, in which the front end 642 is formed, and a vertical face member 645 at the side facing the crews. The upper member 644 has lid bodies 646 and 647 opening/closing the openings of the boxes 636 and 637 and the opening 648a to which a center monitor 622 of the accessory component 621 is exposed. Moreover, the cover 641 is formed of: a monitor storage 648 incorporating the center monitor 622 such as a navigation, a character communication and the like; a meter 649 disposed at the rear side RR (front side) of the lid body 646; and an opening 650 for communicating with the left and right openings of the ducts 634 and 635.

In the lower side LWR of the vertical face member 645 of the cover 641, an instrument lower panel 682 is disposed. In the instrument lower panel 682, a glove box 683 and a parcel tray 685 are formed. In the glove box 683, a glove box lid 684 is freely opened and closed. At the upper side UP of the glove box 683, an audio unit 686 is disposed. A tuning part 686a of the audio unit 686 is normally covered with the glove box lid 684.

The air conditioner 605 includes: a housing 664 installing a well-known air temperature adjusting means, such as an evaporator, a heater and the like; the central vent outlets 661 and the left and right vent outlets 662 and 662, which are disposed in the upper side UP and rear side RR of the housing; and the central defroster outlet 663 disposed similarly in the upper side UP of the housing. Reference numeral 665 denotes a room air inlet. FIG. 5 shows a state where the room air inlet is open. Reference numeral 666 denotes a concave portion surrounding the steering member 661 from the lower side LWR, the concave portion surrounding the upper side UP of the steering member 611 by brackets 669 and 669 protruding from rising walls 667 and 668 of the central vent outlet 661 and the left and right vent outlets 662 and 662 and from a rising wall 668 of the central defroster outlet 663.

In the rear side RR of the base 632, first and second supporting members 671 and 672 are integrally formed. In the first supporting member 671, operation means 624 is supported, which is capable of operating a well-known automatic transmission (not shown) as one of the accessory components 621. Between the second supporting member 672 and the bracket 669 supported on the face of the rear side RR of the housing 664 of the air conditioner 605, an audio 625 and a communication device 626 are supported by supporting means 676, which are a part of the accessory components 621.

As the accessory components 621, besides the above, there are the steering column 623 supported by the steering member 611 and the airbag 627 stored in the airbag storage 639.

Next, a method for mounting the instrument panel assembly on the vehicle will be described. First, the instrument module 602 is supported by use of jigs (not shown). The instrument module 602 in this state and the supporting jigs are set to have a front to rear width size smaller than that of the door opening 604. Thus, the instrument module is brought into the vehicle as it is from the door opening 604 and is attached to a predetermined position inside the vehicle. After the attachment, the supporting jigs are carried out of the vehicle. Next, the garnish molding 603 is attached to the engaging part 643 of the front end 642 of the instrument module 602 and to the engaging part 617 of the upper edge 616a of the cowl box 616, respectively, by being bridged from the upper side UP.

Next, the operation this embodiment of the present invention will be described.

The left and right duct bodies 634 and 635 of the duct assembly 619 are integrally formed while holding the boxes 637 and 638. Thus, the strength of the duct assembly 619 is significantly improved, and the duct assembly 619 becomes a skeletal member capable of being fixedly provided in the steering member 611 supported by the front pillar lower panel 610. Thus, it is possible to obtain a light-weight and simple instrument panel assembly 601, which includes two components, including the cover 641 as a decorated member and the left and right duct bodies 634 and 635 of the duct assembly 619 as the skeletal member.

The left and right duct bodies 634 and 635 of the duct assembly 619 are formed by connecting the connection part 620 disposed approximately at the center of the vehicle to the air conditioner 605. Thus, the duct bodies 634 and 635 are integrated with the air conditioner 605, thereby further improving the strength.

Moreover, the holding of the boxes 637 and 638 by the left and right duct bodies 634 and 635 extending to the left and right from the connection part 620 significantly improves the strength of the duct assembly 605. Thus, regardless of the structural body 631 made of synthetic resin, various accessory components 621 can be surely supported.

Moreover, the connection part 620 of the duct assembly 619 is formed in a lattice manner, including the connection member 636 joined with the air conditioner 605, the strength member 659 and the ribs 660. Thus, the strength of the connection part 620 is significantly improved. Moreover, the member applying the strength is integrated with the duct assembly 619. Thus, another component is unnecessary, leading to a low manufacturing cost.

The left and right duct bodies 634 and 635 of the duct assembly 619 are supported while being mounted by use of attachment pieces 679 and 680 on the upper part of the steering member 611. Thus, the left and right duct bodies 634 and 635 of the duct assembly 619 can be temporarily held only by being mounted on the upper part of the steering member 611, and a stability of the left and right duct bodies 634 and 635 of the duct assembly 619 at the time of supporting is significantly improved.

Before the assembly into the vehicle, there is only the instrument module 602 having a front to rear width smaller than the width of the door opening 604. Thus, an insertion efficiency of the instrument panel assembly 601 into the vehicle room from the door opening 604 can be enhanced. Moreover, the garnish molding 603 is detachably bridged between the front end 642 of the cover 641 of the instrument module 602 and the upper edge 616a of the cowl box 616. Thus, when the need of maintenance arises after mounting the instrument panel assembly 601 on the vehicle, the backside of the cover 641 and the vehicle front area of the instrument module 602 are exposed only by detaching the garnish molding 603. Accordingly, the maintenance is possible without detaching the instrument panel assembly 601, that is, the cover 641, thereby improving a maintenance efficiency.

In one piece of the garnish molding 603, the defroster outlet 653 and the side defroster outlet 655 are formed. Thus, since another component is unnecessary, a low manufacturing cost becomes inexpensive.

The rear end 651a of the main body 651 of the garnish molding 603 is supported so as to cover the front end 642 of the cover 641 of the instrument module 602 from the upper side UP. Thus, at the time of supporting the main body 651 of the garnish molding 603, hammering thereinto from the top can realize the structure mentioned above.

The structural body 631 of the instrument module 602 is integrally formed by synthetic resin having at least the duct bodies 634 and 635 connected to the air conditioner 605 and the boxes 637 and 638 surrounded by the duct bodies 634 and 635. Thus, the strength is increased, and regardless of the structural body 631 made of synthetic resin, various accessory components 621 are supportable.

Regarding a color design of the instrument panel assembly 601, since the cover 641 of the instrument panel assembly is divided into the upper face and the front face, combinations of two-tone color (for example, the upper face is in a color hard to reflect light, the front face is in a bright color and so on) are possible. Moreover, by preparing different shapes, various combinations are possible, thus enabling sharing of components among types of vehicles.

What is claimed is:

1. An instrument panel assembly for a vehicle, comprising:
    an instrument panel; and
    a duct assembly disposed below the instrument panel, the duct assembly defining a vent duct and a glove compartment formed integrally with each other,
    wherein the duct assembly includes a lower-half panel and an upper-half panel both defining the vent duct and the glove compartment.

2. The instrument panel assembly according to claim 1, wherein the glove compartment is arranged in front of at least either one of a driver seat and a passenger seat of the vehicle.

3. The instrument panel assembly according to claim 1, wherein the lower-half panel and the upper-half panel are made of resinous material.

4. The instrument panel assembly according to claim 1, further comprising a steering member that is joined to the duct assembly.

5. The instrument panel assembly according to claim 1, wherein the vent duct is communicated with the glove compartment.

6. The instrument panel assembly according to claim 4, further comprising a wire harness that is arranged, under the lower-half panel, substantially parallel with the steering member.

7. The instrument panel assembly according to claim 4, wherein the instrument panel has cover and a garnish molding detachably attached to the cover, thereby providing an instrument module having the cover and the duct assembly.

8. The instrument panel assembly according to claim 7, wherein the instrument module includes a structural body having accessory components supported thereon and being fixed to the steering member and the instrument panel for covering the structural body, and
    a length of the instrument panel in the fore-and-aft direction of the vehicle is smaller than a length of a vehicle door in the fore-and-aft direction of the vehicle.

9. The instrument panel assembly according to claim 8, wherein the garnish molding has a defroster outlet and a side defroster outlet formed therein.

10. The instrument panel assembly according to claim 8, wherein the garnish molding has its rear end portion covering a front end portion of the instrument panel of the instrument module.

11. The instrument panel assembly according the claim 7, wherein a length of the instrument module and the garnish molding in their assembled state in the fore-and-aft direction of the vehicle is greater than a length of a vehicle door in the fore-and-aft direction of the vehicle.

12. The instrument panel assembly according to claim 1, wherein the duct assembly has a connection part connected to an air conditioner and left and right duct bodies extended to the left and right from the connection part.

13. The instrument panel assembly according to claim 12, wherein the duct assembly has accessory components supported thereon.

14. The instrument panel assembly according to claim 12, wherein the connection part of the duct assembly comprises:
    a connection member formed by connecting the left and right duct bodies to a vent outlet of the air conditioners;
    a strength member bridging between the left and right duct bodies; and
    ribs formed to extend from the strength member in front and rear and formed integrally with the vent outlet.

15. The instrument panel assembly according to claim 13, further comprising a steering member, wherein the duct assembly is mounted on the steering member.

* * * * *